(12) United States Patent
Volpato et al.

(10) Patent No.: US 11,794,394 B2
(45) Date of Patent: Oct. 24, 2023

(54) MONITORED MIXTURE AND DOSING HEAD

(71) Applicant: AFROS S.P.A, Caronno Pertusella (IT)

(72) Inventors: Marco Volpato, Caronno Pertusella (IT); Maurizio Corti, Como (IT)

(73) Assignee: Afros S.P.A., Caronno Pertusella (IT)

( * ) Notice: Subject to any disclaimer, the term of this patent is extended or adjusted under 35 U.S.C. 154(b) by 567 days.

(21) Appl. No.: 16/915,770

(22) Filed: Jun. 29, 2020

(65) Prior Publication Data

US 2021/0001525 A1 Jan. 7, 2021

(51) Int. Cl.
*B29C 45/58* (2006.01)
*B29C 67/24* (2006.01)
(Continued)

(52) U.S. Cl.
CPC .......... *B29C 45/581* (2013.01); *B01F 23/405* (2022.01); *B01F 23/45* (2022.01);
(Continued)

(58) Field of Classification Search
CPC .......................... B29C 45/581; B29C 2045/58
See application file for complete search history.

(56) References Cited

U.S. PATENT DOCUMENTS

| 4,069,948 | A | | 1/1978 | Saaty et al. |
| 4,399,105 | A | * | 8/1983 | Tilgner ................. B29B 7/7433 264/DIG. 83 |

(Continued)

FOREIGN PATENT DOCUMENTS

| DE | 26 13 719 A1 | 10/1977 |
| DE | 30 21 095 A1 | 12/1981 |

(Continued)

OTHER PUBLICATIONS

Search Report in applicaito No. 201900010524, dated Mar. 16, 2020, 2 pages.

*Primary Examiner* — Nahida Sultana
*Assistant Examiner* — Debjani Roy
(74) *Attorney, Agent, or Firm* — Patterson & Sheridan LLP; Malgorzata A. Kulczycka

(57) ABSTRACT

The invention relates to a high-pressure mixing, dosing and recirculation head for injection or casting reaction molding, said high-pressure mixing, dosing and recirculation head comprising a head body, a mixing chamber, obtained in the head body wherein a valve element or mixing valve slides and in fluid communication with a supply duct, and a self-cleaning element comprising a scraping portion, said self-cleaning element being structured to slide in said supply duct, as well as comprising an apparatus for controlling and commanding mixing, supply and recirculation comprising a plurality of sensors and transducers mounted on board of the head body and of the components parts of the head connected thereto to detect and transform representative physical quantities of at least one operational status of said high-pressure mixing, dosing and recirculation head into electrical signals and an electronic control and storing system adapted to synchronously control and scan said sensors and transducers and adapted to receive and process said electrical signals indicative of said at least one operational status, at the beginning and during the operational phases of said high-pressure mixing, dosing and recirculation head to compare them with each other and with electrical signals representative of a predetermined reference operational status. The invention also relates to a high-pressure mixing, dosing and recirculation method for injection or casting reaction molding.

37 Claims, 13 Drawing Sheets

(51) Int. Cl.
*B01F 23/45* (2022.01)
*B01F 23/47* (2022.01)
*B01F 23/40* (2022.01)
*B01F 25/50* (2022.01)
*B01F 25/00* (2022.01)
*B01F 35/22* (2022.01)
*B01F 35/12* (2022.01)
*B01F 35/213* (2022.01)
*B01F 35/21* (2022.01)
*B01F 35/214* (2022.01)
*B01F 35/221* (2022.01)
*B01F 101/00* (2022.01)

(52) U.S. Cl.
CPC .......... *B01F 23/47* (2022.01); *B01F 25/1051* (2022.01); *B01F 25/50* (2022.01); *B01F 35/123* (2022.01); *B01F 35/213* (2022.01); *B01F 35/2111* (2022.01); *B01F 35/2113* (2022.01); *B01F 35/2115* (2022.01); *B01F 35/2142* (2022.01); *B01F 35/22* (2022.01); *B01F 35/2213* (2022.01); *B01F 35/2215* (2022.01); *B29C 67/246* (2013.01); *B01F 2101/2805* (2022.01)

(56) References Cited

U.S. PATENT DOCUMENTS

| | | | | |
|---|---|---|---|---|
| 2002/0047224 | A1* | 4/2002 | McCollum | B29C 70/443 |
| | | | | 264/275 |
| 2010/0259757 | A1* | 10/2010 | Ayers | G01N 21/53 |
| | | | | 73/1.02 |
| 2015/0174540 | A1* | 6/2015 | Volpato | B29C 67/247 |
| | | | | 422/131 |
| 2018/0242595 | A1* | 8/2018 | Huerta-Ochoa | A47J 36/321 |
| 2019/0152169 | A1* | 5/2019 | Volpato | B29C 70/548 |
| 2020/0307025 | A1* | 10/2020 | Volpato | B29B 7/7694 |

FOREIGN PATENT DOCUMENTS

| | | | | |
|---|---|---|---|---|
| DE | 38 11 642 | A1 | 10/1989 | |
| EP | 2 366 525 | A1 | 9/2011 | |
| WO | WO 91/10551 | A1 | 7/1991 | |
| WO | WO-2007058950 | A2 * | 5/2007 | .......... A61B 5/0017 |

* cited by examiner

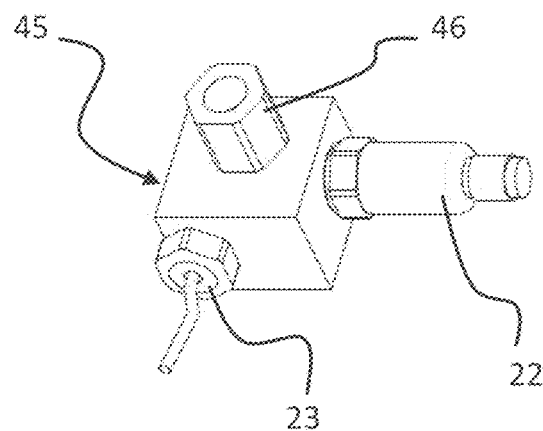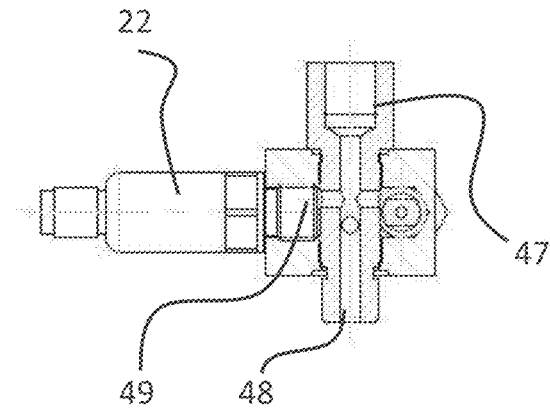
FIG. 3A          FIG. 3A'
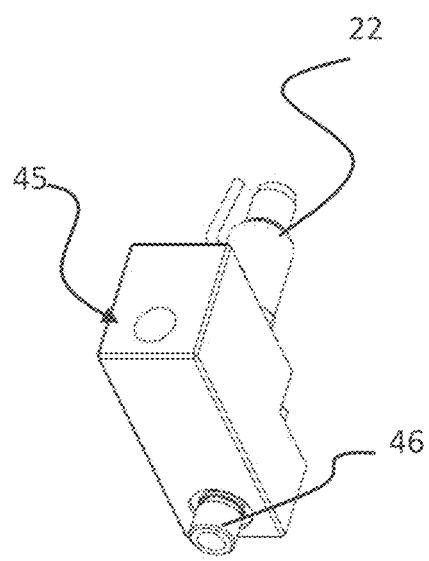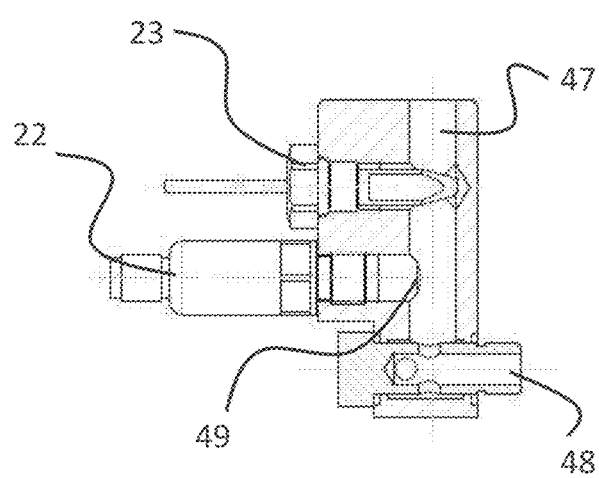
FIG. 3B          FIG. 3B'

MONITORED MIXTURE AND DOSING HEAD

BENEFIT CLAIM

This application claims the benefit under 35 U.S.C. 119 of Italy patent application 102019000010524, filed Jul. 1, 2019, the entire contents of which are hereby incorporated by reference for all purposes as if fully set forth herein.

FIELD OF APPLICATION

The present invention relates to a mixing, dosing and recirculation head of reactive resins, in particular at a high-pressure head, for injection or casting reaction molding comprising a mixing chamber, a valve element or mixing valve, a supply duct, in fluid communication with the mixing chamber, a mixing cleaning element or self-cleaning stem, actively sliding in the outflow chamber, and a controlling and commanding apparatus.

The invention generally relates to the field of reaction molding plants by means of thermosetting or expanding reactive resins.

The invention also relates to a mixing, dosing and recirculation method of reactive resins, in particular at a high-pressure, for injection or casting reaction molding.

PRIOR ART

As it is known in this specific technical field, in injection or casting reaction molding processes, the reacting resins are dosed in a mixing mechanical device commonly called high-pressure mixing, dosing and recirculation head.

To carry out an optimal mixing of reactive resins, the various components are dosed in the liquid state and in a stoichiometric ratio towards the mixing head from which they are introduced into a common chamber where they are intimately mixed and then poured or injected into a mold where they complete the reaction. Alternatively, they are recirculated towards the tank.

This technology allows to produce thousands of pieces with the same dimensions and characteristics relatively quickly and through a repeatable and rapid industrial process.

In these processes in the above high-pressure mixing, dosing and recirculation head, an intimate mixing of two or more liquid reactive resins is obtained by feeding the resins in a precise ratio and under pressure to two or more injectors provided with nozzles facing towards a mixing chamber. The injectors transform, through the respective nozzles, the pressure energy of the resins into kinetic energy, i.e. into speed of the jects produced by the restriction of the nozzles. In this way, in said mixing chamber a very fine turbulence is generated, which is generated by the collision of jets produced at a high-pressure with each other and/or against the walls. In this way, by means of the vorticity produced by the turbulence, the dispersion of the resins with each other and the aforementioned intimate mixing are ensured. Further to the mixing the reacting resins then flow out along the outlet from the mixing chamber and along other outflow ducts, being then released or expelled into a mold where the mixed resins react chemically and complete the reaction by forming plastics, impregnating agents or conglomerates in the solid form, in the form of foams, compacts or gels, and give rise to the desired product within the mold. The injection operation lasts from few seconds to a few tens of minutes and the reagent mixture spreads from the injection point throughout the mold until it fully fills in the mold or, in the case of fiber impregnation, up to the more peripheral end-diffusion and impregnation areas.

Basically, there are two types of these high-pressure mixing heads.

A first type conventionally defined "straight head", in which the mixing chamber also forms a supply duct.

A second type conventionally defined "L-head", in which the mixing chamber drains the reagent resins into a supply duct, whose axis is placed in a tilted transversal position, more generally perpendicular, with respect to the axis converging thereto of the mixing chamber. The supply duct is generally longer and with a greater section than the mixing chamber. The section of the mixing chamber is smaller to ensure high turbulence and correct mixing. Turbulence must instead be dampened in the supply duct, which is longer and with a greater section, until it possibly reaches a laminar regime or creates a jet that is consistent at the outlet.

Within the supply duct of this second type a so-called self-cleaning stem slides, i.e. an element that is hydraulically moved or that has the function of expelling the residues of the reagent resins mixture towards the mold at the end of the supply.

The shape and dimensions of said self-cleaning stem are conjugated with respect to the cylindrical self-cleaning duct with reduced clearances that allow its scraper function of the residues of reacted resins.

The mixed resins in the reaction phase are supplied along the supply duct or self-cleaning duct and then expelled by the final movement of the self-cleaning stem at each casting.

Typically, inside the mixing chamber a valve element, controlled by a hydraulic cylinder, slides. Said valve element, defined in the field as mixing valve, has longitudinal slots along the sides at the radial position of the respective injectors. These slots, when the mixing valve is in a closed (or advanced) position, put in communication the outlet of the injectors with respective recirculation holes, recirculating the resins exiting through a return line towards its storage tank. Vice versa, when the mixing valve is in the open (or backward) position the front of the valve moves back beyond the injectors putting the jets of the reactive resins in fluid communication with the mixing chamber and giving rise to mixing thereof. During the closing said mixing valve advances, restores the recirculation of the resins and cleans up the mixing chamber from the resins in the reaction phase, expelling the content thereof towards the supply duct towards which the mixing chamber itself faces.

During operation, the mixing valve must perform the opening and closing movements as quickly as possible and with repeated and repeatable times.

Likewise, the self-cleaning stem sliding in the supply duct must also perform opening and closing movements sequentially with those of the mixing valve (in the opening it first opens the valve, in the closing it closes after the valve) as quickly as possible and with repeatable times.

The timing of the movement of the stem must in fact be quick in order not to lengthen the time necessary to the production of a product, actually being non-operational times, as well as the times for moving or handling the molds and for moving the high-pressure mixing, dosing and recirculation head.

The high-pressure mixing heads are generally made of a section, called head body, which has the injectors, the resin inlet and recirculation ducts and the mixing chamber. The supply duct may be made as a single piece with the head body, or as a separated piece fixed to the head body with mechanical fixing. The movements of the mixing valve and of the self-cleaning stem are commanded and controlled by pistons, integral with said elements, which slide in hydraulic cylinders and are commanded through suitable valves.

Though the mixing head according to the prior art ensures a satisfying operation, it is still subjected to problems which invalidate certain necessary specific operating conditions.

Indeed, during the passage between a closed position and an open position, the frontal cylindrical section of the mixing valve, where the recirculation longitudinal slots are not present, covers for a short time but abruptly the passage on which the injectors face, causing a very brief disturbance interruption on the delivery of the resins and a consequent possible supply of transient flow rates with ratio errors between the reactive components when the jets of the injectors are uncovered and released to be introduced into the mixing chamber. When the resins recirculate in the slots of the valve and along the return ducts towards the tanks, they are subjected to a hydraulic resistance to recirculation which determines a recirculation pressure in the slots and on the face of the injectors, pressure that fails when the slots and the valves are retracted, and the injectors uncovered. Moreover, on the surface of the valve, in the cylindrical part where the slots are not present, a veil of reacted resin is formed, which tends to accumulate and slow down the movement by friction during the sliding. This also causes a sudden heating of the surfaces by friction that may cause dilations and distortions which, with the repetition of the operating cycle, may damage the surfaces of the mechanical parts.

This problem is particularly relevant for straight heads.

Furthermore, the mixing valve is actuated by a hydraulic command provided with seal gaskets which, during the repeated use, may wear out or be damaged.

Likewise on the cylindrical surface of the self-cleaning stem and of the supply duct a very adherent veil of reacted resin which, though a very reduced clearance is provided between the surfaces of the two components, is not completely removed by the scraping movement of the self-cleaning stem but tends to accumulate in some areas longitudinally extended along the duct and to cause a pressure force on the stem which directly slides therein towards the diametrically opposite surface and to slow down the movement by friction during the sliding. Moreover, this causes a heating of the surfaces by friction, especially of those of the side opposite the accumulation areas of the reacted resins above described, side from which the veil of resin may be completely removed due to the strong compression and thus create metal-to-metal surface scraping conditions that determine a strong surface heating and following dilations and distortions which, with the repetition of the operational cycle, may damage the surfaces of the mechanical parts.

Similar problems may occur for the sliding of the mixing valve, as already reported, whose opening and closing speed is important to ensure the mixing precision during the start and end mixing transients.

Moreover, between the head body and the control hydraulic cylinder of the self-cleaning stem a spacer is generally interposed, which separates the control hydraulic section of the self-cleaning stem, provided with suitable seals on the stem, from the supply and scraping area of the reacting resins. The chamber of said spacer may fill in with shavings of reacted resin, transported by the movement of the self-cleaning stem and the accumulation of shaving could clog the spacer and acts as an additional brake to the movement of the stem.

The part of the self-cleaning supply duct protruding from the head body, during its insertion into the mold, may occur in the wrong position hitting the mold repeatedly.

Furthermore, the hydraulic control oil of the control pistons may transport debris or shavings into the respective cylinders and cause difficulty in sliding or decanting, as well as a wrong stop position at the end-stroke of the piston heads.

It would be desirable to overcome these malfunction and slow performance drawbacks by means of a detection and instantaneous verification of such malfunction, or, preferably, through the detection of a need for preventive maintenance on the high-pressure mixing and mixing dosage and recirculation heads and on the related connection to the resin feeding and hydraulic control system.

The technical problem underlying the present invention is to conceive a high-pressure mixing, dosing and recirculation head able to detect, monitor and verify the important operational parameters thereof, by detecting and locating, even in a preventive manner, the onset of malfunctions and/or performance deterioration.

Another object of the present invention is to conceive a mixing head provided with an apparatus that is easily implementable in existing systems.

A further object of the invention is to conceive a high-pressure mixing, dosing and recirculation head provided with an apparatus that allows an immediate reading of the performance for any operator of the field.

SUMMARY OF THE INVENTION

The solution idea underlying the present invention is to provide a mixing head provided with equipment through which it is possible to instrumentally detect in a coordinated, direct or indirect manner, the operational status of the high-pressure mixing, dosing and recirculation head through the detection of specific operating physical quantities in positions that are indicative of these operational states.

Based on this solution idea the technical problem is solved by a high-pressure mixing, dosing and recirculation head for injection or casting reaction molding, said high-pressure mixing, dosing and recirculation head comprising a head body, a mixing chamber, obtained in the head body in which a valve element or mixing valve slides and in fluid communication with a supply duct, and a self-cleaning element, preferably in the shape of a stem, also called self-cleaning stem, comprising a scraping portion that is structured to slide in said supply duct, as well as comprising an apparatus for controlling and commanding the mixing, supply and recirculation comprising a plurality of sensors and transducers mounted on board of the head body and of the component parts of the head connected thereto to detect and transform physical quantities representative of at least one operational status of said high-pressure mixing, dosing and recirculation head into electrical signals and an electronic control and storing system adapted to synchronously control and scan said sensors and transducers and adapted to receive and process said electrical signals that are indicative of said at least one operational status, at the beginning and during the operating phases of said high-pressure mixing, dosing and recirculation head to compare them with each other and with electrical signals that are representative of a predetermined reference operational status.

The self-cleaning stem may be made of a homogeneous cylindrical section or of a cylindrical scraping end part and of a cylindrical control section with reduced diameter towards the scraping part. The shape and dimensions of the scraping section of the self-cleaning stem are mechanically coupled to the duct wherein it slides with reduced clearances which allow the scraper function thereof of the reacted resins residues. Typically, clearances comprised between few microns (3 or 4 microns) up to 60-70 microns depending on the specific design physical quantities normally linked to the materials and dimensions of the supply duct.

Preferably, the plurality of sensors and transducers comprises at least one pressure transducer on at least one, but preferably on all of the delivery lines for the related injectors also acting as control pressure switch and/or on at least one, but preferably on all of the resin recirculation lines. Still more preferably the plurality of sensors and transducers further comprises at least one pressure transducer on at least one, but preferably on all of the delivery and discharge lines of the hydraulic control fluid for the related control chambers.

In a preferred embodiment said at least one pressure transducer, also acting as control pressure switch, is positioned along a resin fluid vein close to the supply to the respective injector and exiting from the respective recirculation opening, close to the inlet and/or outlet from the control cylinder of the mixing valve and at the inlet and/or outlet from the control cylinder of the self-cleaning stem.

Preferably, the plurality of sensors and transducers comprises at least one temperature detector or probe provided with a control thermo-resistance or a thermocouple.

In a preferred embodiment said at least one control temperature detector is positioned along the resin fluid vein close to the supply to the respective injector and/or along the resin fluid vein close to the outlet from the respective recirculation opening, along the fluid vein of the control fluid close to the inlet and close to the outlet from the control cylinder of the mixing valve and close to the inlet and to the outlet of the control fluid from the control cylinder of the self-cleaning stem.

Preferably, the plurality of sensors and transducers is grouped in a plurality of support structures.

Preferably, the plurality of sensors and transducers comprises at least one flowmeter for the resin.

In a preferred embodiment said at least one flowmeter is positioned along the fluid vein of the supply to the respective injector and/or along the fluid vein exiting from the respective recirculation opening, along the inlet and/or outlet fluid vein from the control cylinder of the mixing valve, and along the inlet and/or outlet fluid vein from the control cylinder of the self-cleaning stem.

Preferably the plurality of sensors and transducers comprises at least one accelerometer, applied to least one of the components parts of the head body to evaluate the acceleration of the high-pressure mixing, dosing and recirculation head in at least one spatial direction.

Preferably the head comprises at least one section with significant local deformation, obtained by means of an axial revolution about an axis of the supply duct.

Still preferably, the plurality of sensors and transducers comprises at least one strain gauge, or extensimetric resistance, or a group of strain gauges for the detection of the differential deformation of characteristic surfaces, differential deformation that is directly connectable to the force transmitted from the scraping portion and from the accumulation of reacted resin along the dragging section of the self-cleaning stem to the supply duct during its own movement.

In a preferred embodiment, the supply duct is made as a single piece from a sleeve connected to the head body through a flange or peripheral portion blocked between the head body and a spacer element or formed in two parts connected through a portion fixed to the head body by means of screws or thread.

Preferably, the plurality of sensors and transducers provides at least one further strain gauge connected and fed for the compensation of a thermal deformation.

In a preferred embodiment in particular said strain gauge, or extensimetric resistance, or group of strain gauges that are bridge-connected, detect the localized deformation of the collar in the shape of an annular extension for blocking the sleeve that forms the supply duct, or self-cleaner, to the head body and to the spacer. In particular, being connected in a Wheatstone-bridge manner in a specific circumferential slot obtained below a flange. In this way, the deformation directly and therefore the effort that is transmitted from the self-cleaning stem to the sleeve is detected.

In an embodiment the plurality of sensors and transducers comprises at least one load cell, preferably annular-shaped, which is pushed by preloading it through an elastic ring or preloaded springs against a flange or an annular element protruding from the outer surface of the self-cleaning sleeve equipped with shoulder surfaces for the mechanical locking of the self-cleaning sleeve itself, so as to directly detect the load variation that the movement of the self-cleaning stem transmits to the sleeve surface during its own scraping and expulsion movement of the reagent resins and of the reacted resin veil layered on the surfaces of the supply duct inside the sleeve itself.

In a still alternative embodiment at least one load cell is positioned below the fixing screws head of the self-cleaning cylinder, detecting the load variation that acts on the single screw to detect the variation of the forces transmitted through the screws from the sleeve and more generally from the self-cleaning duct to the spacer and to the control cylinder of the self-cleaner due to the forces deriving from the sliding of the self-cleaning stem within the supply duct and from the scraping of the reacted resins veil.

Still preferably, the plurality of sensors and transducers comprises at least one radio frequency identification pad (RFID). In this way, the number of round-trip movements of the self-cleaning stem and mixing valve is recorded, by storing the parameters relating to the first installation and to the following ordinary and extraordinary maintenance interventions. The high-pressure mixing, dosing and recirculation head, through said pad, is further adapted to communicate and record the detected data, interfacing via an antenna with a transmitter installed on the command and control system of a dosing machine that is programmed to write, store and update said data.

Preferably, the plurality of sensors comprises at least one control thermocouple and/or one thermo-resistance, for detecting the temperature of significative sections of the head body subjected to thermal cycles deriving from the circulation of the reactive resins in the inlet and outlet holes at the head body.

Still preferably, at least one control thermocouple and/or one thermo-resistance is inserted in a support structure for detecting the temperature of an outer surface along a lower extension of the supply duct.

In a preferred embodiment, the command and control apparatus further comprises devices for sampling and digitizing the signals of the sensors/transducers and a mass memory, adapted to store values of the physical quantities in different operational states sampled over time, also comprising a start time of each measurement determining a contemporaneity synchronization with a start of a sequence of the head.

Preferably, the plurality of sensors comprises at least one probe equipped with a thermocouple and/or a thermistor for controlling the temperature at significant positions for monitoring the mixing and dosing head.

Still preferably, the plurality of sensors and transducers comprises at least one linear transducer, to detect the position and speed of the scraping portion of the self-cleaning stem along the control cylinder and consequently of the end thereof along the self-cleaning duct.

In a further preferred embodiment, the control system of the control apparatus is a programmable and numerical control logic machine.

Advantageously, the high-pressure mixing, dosing and recirculation head according to the present invention may be a "straight" head, with the mixing chamber also forming the supply duct, or a so-called "L" head, with the mixing chamber with a longitudinal axis that is transverse with respect to a longitudinal axis of the supply duct.

Furthermore, the mixing and dosing head according to the invention comprises at least one pair of injectors, adapted to supply a respective reacting resin into the mixing chamber.

Furthermore, the high-pressure mixing, dosing and recirculation head according to the invention comprises a sliding valve element equipped with recirculation slots, or recirculation openings, of the resins also called mixing valve for the sequential opening and closing of a fluid path from the injectors to the mixing chamber and for the expulsion of the resin residues mixed by the mixing chamber at the end of the supply.

Furthermore, said mixing valve comprises recirculation slots, or openings, adapted to the recirculation of fluid material exiting from each injector in the closing condition of the valve itself to deviate the fluid path to recirculate towards the respective accumulation tank both in the phase prior to mixing and supply and in the phase following the supply through the mixing chamber.

During the recirculation phases, the dosing control and command system manages the transients for the correct setting and control of the flow rates of the fluid materials, which must be supplied and mixed in a stoichiometric ratio, of the pressures and temperatures of the same.

The mixed resins in the reaction phase are supplied and then expelled be the final closing movement of the valve and in sequence, if present, of the self-cleaning stem each time the mixing valve has been closed in an advanced position and that the supply operation has ended.

In a preferred embodiment the supply duct is made of an independent sleeve inserted in the high-pressure mixing, dosing and recirculation head, thus resulting mechanically independent of the body of the mixing and dosing head.

Preferably, in a preferred embodiment of the invention the self-cleaning stem is activated by means of a control piston, acting inside a control cylinder.

Still preferably, in a preferred embodiment of the invention the mixing valve is activated by means of a control piston, acting inside a control cylinder.

Each piston sliding in the cylinder is controlled by the hydraulic pressure alternatively introduced by the control devices.

Still preferably, a spacer element equipped with a spacer chamber is interposed between control device and supply duct, whose surfaces are wetted by the reacting resins.

The function of the spacer chamber is to separate the self-cleaning stem section wetted by the reacting resins, and thus soiled with layers of reacted resin, from the section entering the control cylinder. A further function is to accumulate the reacted resin shavings transported by the movement and scraping performed by the self-cleaning element and to allow removing them through mechanical action or through a forced flushing of lubricating liquid.

In a preferred embodiment, the probe with control thermocouple and/or a thermo-resistance comprises a hollow ogive with a longitudinal dimension greater than a transverse dimension, totally immersed in the fluid vein from which the temperature to be detected is transmitted, with limited heat exchange towards the support structure.

According to another aspect of the present invention, a mixing, dosing and recirculation method for injection or casting reaction molding by means of a high-pressure mixing, dosing and recirculation head comprising a head body, a mixing chamber, a self-cleaning element, a plurality of sensors and transducers and a control electronic system is provided, said method comprising the steps of:

controlling a detection from the control electronic system to said plurality of sensors;

detecting representative physical quantities of at least one operational status of the high-pressure mixing, dosing and recirculation head through the plurality of sensors and transducers;

transforming the physical quantities detected into corresponding electrical signals through the plurality of sensors and transducers;

synchronously scanning, receiving and processing the plurality of sensors by means of the control electronic system at the beginning and during the operating phases of the high-pressure mixing, dosing and recirculation head;

comparing the electrical signals with each other and with electrical signals representative of a predetermined reference operational status.

Preferably, the mixing, dosing and recirculation method by means of a high-pressure mixing, dosing and recirculation head (1, 1') for injection or casting reaction molding comprising a plurality of sensors (19), further comprises the steps of:

providing at least one mixing chamber, wherein a recirculation self-cleaning element slides, afferent to an orthogonal supply duct, wherein a self-cleaning element slides;

applying at least one strain gauge, or extensimetric resistance, of the plurality of sensors (19) to detect a differential deformation status on a significative detection surface of local deformation at the supply duct and/or at constraint systems of the supply duct;

further connecting in a Wheastone bridge manner the at least one extensimetric resistance with at least one second resistance adapted to detect a thermal deformation;

equipping the supply duct with at least one temperature sensor;

setting a variation detection of the stress status through the at least one extensimetric resistance by means of the control electronic system (21);

detecting physical quantities representative of at least one operational status of the high-pressure mixing, dosing and recirculation head (1, 1') through the plurality of sensors comprising the at least one extensimetric resistance;

synchronously scanning, receiving and processing the plurality of detection sensors by means of the control electronic system (21) at the beginning and during the operating phases of the high-pressure mixing, dosing and recirculation head (1, 1');

comparing the electrical signals with each other and with electrical signals representative of a predetermined reference operational status;

sending sound or voice digital information based on the variations of the operational status.

Still preferably, the mixing, dosing and recirculation method by means of a high-pressure mixing, dosing and recirculation head (1, 1') for injection or casting reaction molding further comprises the steps of:

providing at least one mixing chamber (3) wherein a hydraulically controlled recirculation and self-cleaning element slides;

providing an orthogonal supply duct wherein a hydraulically controlled self-cleaning element (11) slides, wherein at opposite hydraulic chambers of control cylinders of at least one of said self-cleaning elements at least one support and assembly structure comprising at least one probe is applied;

equipping the probe with at least one control thermo-couple and/or at least one thermo-resistance (23, 26, 29);

inserting at least one pressure transducer into the at least one support structure (45), at a passage of fluid vein at an inlet and/or outlet of control fluids;

controlling a detection of the temperatures and pressures by means of the control electronic system (21);

detecting physical quantities representative of at least one operational status of the high-pressure mixing, dosing and recirculation head (1, 1');

synchronously scanning, receiving and processing the plurality of sensors by means of the control electronic system (21) at the beginning and during the operating phases of the high-pressure mixing, dosing and recirculation head (1, 1);

comparing the electrical signals with each other and with electrical signals representative of a predetermined reference operational status;

sending sound or voice digital information based on the variations of said operational status.

The features and advantages of the apparatus and method according to the invention will become apparent from the following description of an embodiment given by way of non-limiting example with reference to the appended drawings.

BRIEF DESCRIPTION OF THE DRAWINGS

FIG. 3A, 3B, 3C, 3D and sections 3A', 3B', 3C', 3D' show components of a particular embodiment of the high-pressure mixing, dosing and recirculation L-head of FIG. 3;

In the different figures, analogous elements will be identified by analogous reference numbers.

DETAILED DESCRIPTION

With reference to these figures, reference number 1 globally and schematically indicates a high-pressure mixing, dosing and recirculation head according to the present invention.

The invention is particularly suitable both when the high-pressure mixing, dosing and recirculation head used in the reaction casting or injection systems is fixed on a mold and when it is used to serve in sequence different molds. Especially when the use requires multiple supply sequences, particularly frequent and close over time and used in high production continuity conditions. In the latter case, in fact, the implementation of the detection technology through sensors and transducers installed directly on the head or close to the inlets and outlets of the resins and control fluids, allows to detect parameters that are directly or indirectly connected to the performance and their repetitions in use, for instance the speeds and times of implementation and any increases in the parameters according to temperature and frequency of use. Furthermore, it is possible to detect and monitor changes in the parameters referred to reference values to highlight changes in performance and have indications on the degradation or variation of the process and/or elements of the head and to intervene to restore the optimal process parameters and/or to perform preventive maintenance or replace of worn elements or components and also to compensate for possible changes in some parameters with changes in command and control ones.

Figure 1:
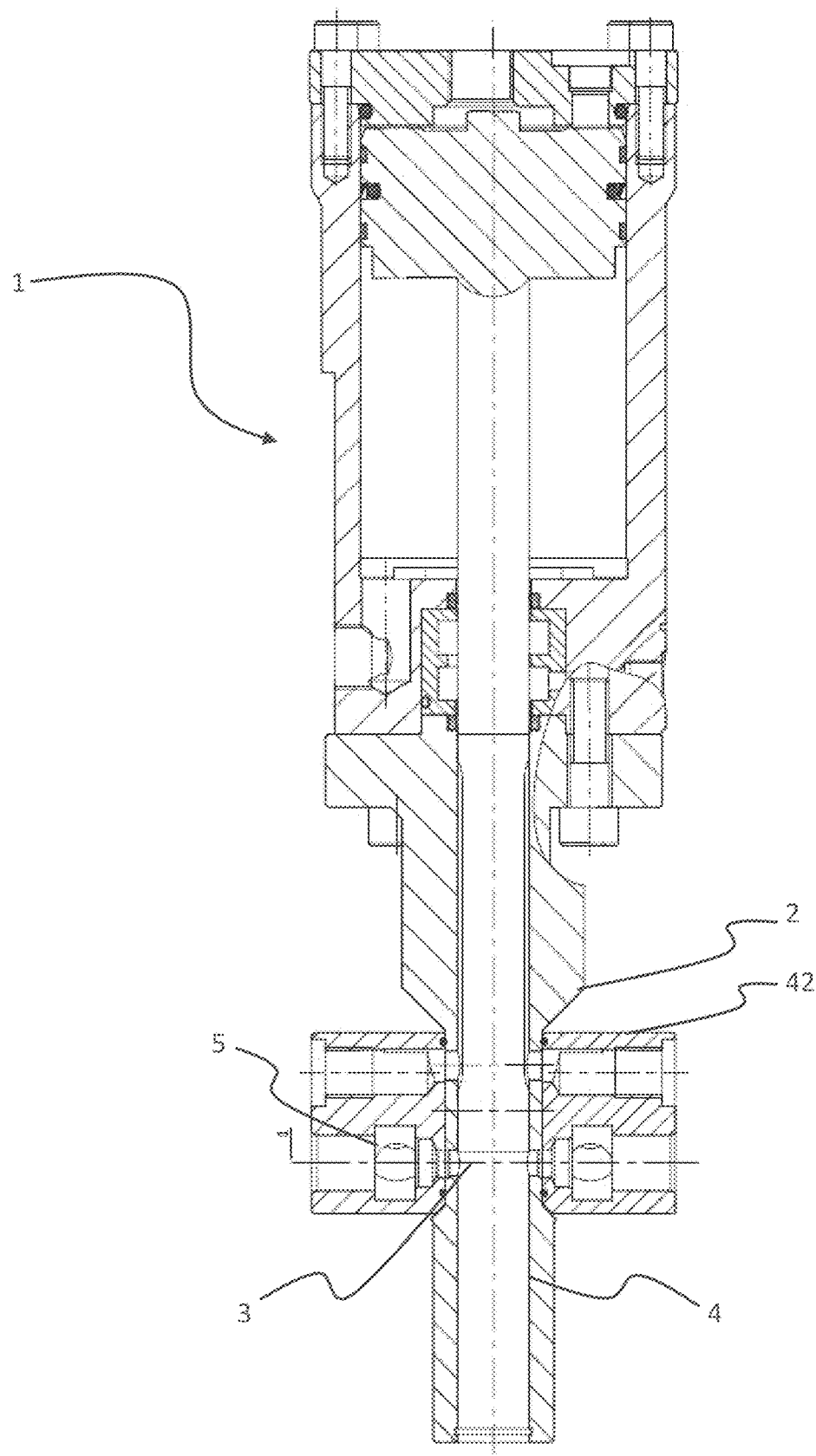
FIG. 1 shows a schematic view of a high-pressure mixing, dosing and recirculation head with a straight configuration according to the prior art.

In FIG. 1 a high-pressure mixing, dosing and recirculation head 1, the so-called "straight" head according to the prior art, with injector-holder and recirculation blocks 42 and a head body 2 that comprises a mixing chamber 3 also forming a supply duct 4, is schematically represented.

Figure 2:
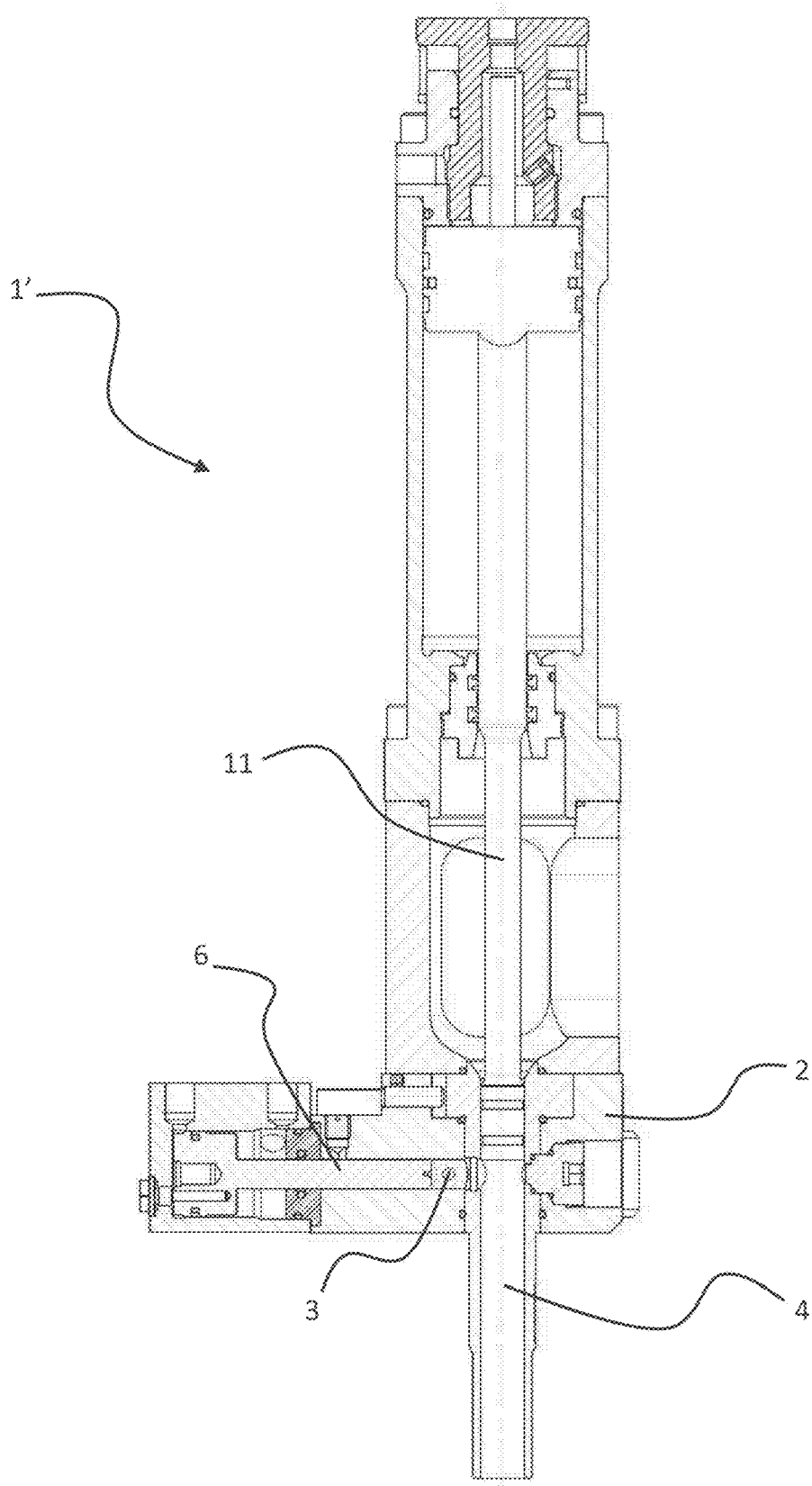
FIG. 2 shows a schematic view of a high-pressure mixing, dosing and recirculation head with an L configuration according to the prior art.

In FIG. 2 a high-pressure mixing, dosing and recirculation head 1', the so-called "L" head, i.e. configured with a mixing chamber 3 placed tilted, generally perpendicular, with respect to a supply duct 4, is schematically represented.

The generic high-pressure mixing, dosing and recirculation head according to the present invention provides a solution that is implementable both on one and the other conformation of mixing and dosing head 1 or 1'.

Hereinafter and in the figures particular reference will be made to the solution with high-pressure mixing, dosing and recirculation "L-head" 1', but it will be apparent to a skilled person that the described solutions are not difficult to be applied to a "straight" head 1.

In case of a mixing and dosing "L-head" 1' the section of the supply duct 4 is of greater dimension than that of the mixing chamber 3. Indeed, in the mixing chamber 3 it is necessary to generate a strong turbulence in a confined space to favour the effective mixing of the reactive resins, whereas in the supply duct 4 the reduction of the turbulence is desired until possibly obtaining a laminar regime or at least cohesive to the outlet. This ensures an effective mixing by turbulence in the chamber 3 and an optimal outflow without splashing into the mold wherein the mixing and dosing head 1' releases the mixture of reacting resins.

Figure 4:
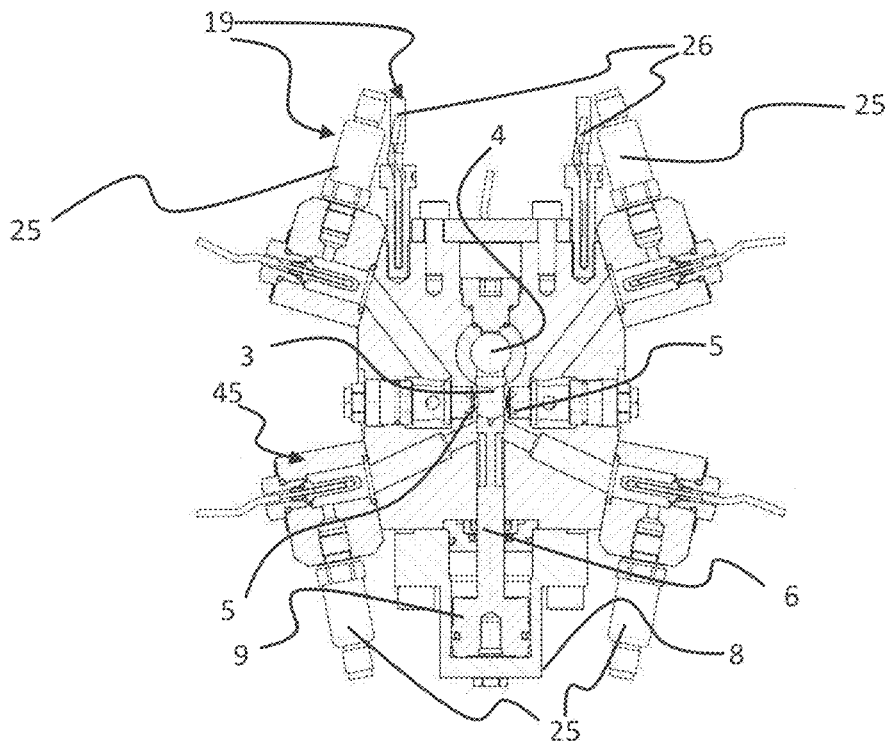
FIG. 4 shows a sectional view of the mixing and dosing L-head of FIG. 3.

As visible in FIG. 4, in the mixing chamber 3 reacting resins are introduced by using at least two injectors 5.

Inside the mixing chamber 3 a valve element, or mixing valve 6, equipped with longitudinal slots at each injector is positioned. When it moves in opening and stops in a retracted position, the valve 6 releases the face of the injectors 5 which introduce the jets of the reactive resins into the mixing chamber 3. When the mixing valve 6 moves in an advanced or closing position, it expels the mixed reacting resins from the mixing chamber while the injectors do not stop the resins supply, but simply each of the reacting resins is not introduced into the mixing chamber but into suitable recirculation slots that form a recirculation path towards the supply tanks of the reactive resin itself, thus keeping the reactive resins separated. When the mixing valve is in the open rearward position, the resin jets collide at a high speed with each other or against the walls of the mixing chamber giving rise to the high turbulence that causes the intimate mixing thereof.

The mixing valve 6 is actuated by a control device 8. In the present embodiment said control device 8 is represented by a hydraulic control piston 9 acting in a hydraulic control cylinder 10.

In the supply duct 4 a self-cleaning stem 11, in particular a scraping portion 11C of the self-cleaning stem 11, acts with an alternating movement in sequence with the mixing valve 6, being adapted to scrap and expel the mixture of reacting resins present inside the supply duct 4 towards the mold, each time the mixing valve 6, by closing up, stops the so-called fluid introduction from the injectors 5 into the mixing chamber 3 and expels the reactive mixture from the mixing chamber towards the supply duct.

The self-cleaning stem 11 is actuated by means of a control device 13. In the present embodiment said control device 13 is represented by a hydraulic control piston 14 acting in a hydraulic control cylinder 15, which actuates the self-cleaning stem 11.

Between the supply duct 4 and the control device 13 in the present embodiment a spacer member 16, simply indicated as spacer 16, is preferably placed, which is equipped with a spacer chamber 16A that separates the portion of self-cleaning stem wetted and soiled by the reacting resins from the control portion. This expedient prevents residues of reacted resin from being dragged by the retraction or opening of the self-cleaning stem 11 within the group of seals 17 of the hydraulic control portion.

The hydraulic control part of the self-cleaning stem 11 is longitudinally separated from the body of the high-pressure mixing, dosing and recirculation head by means of a seal-holder bush 17, keyed at the spacer 16.

Figure 3:
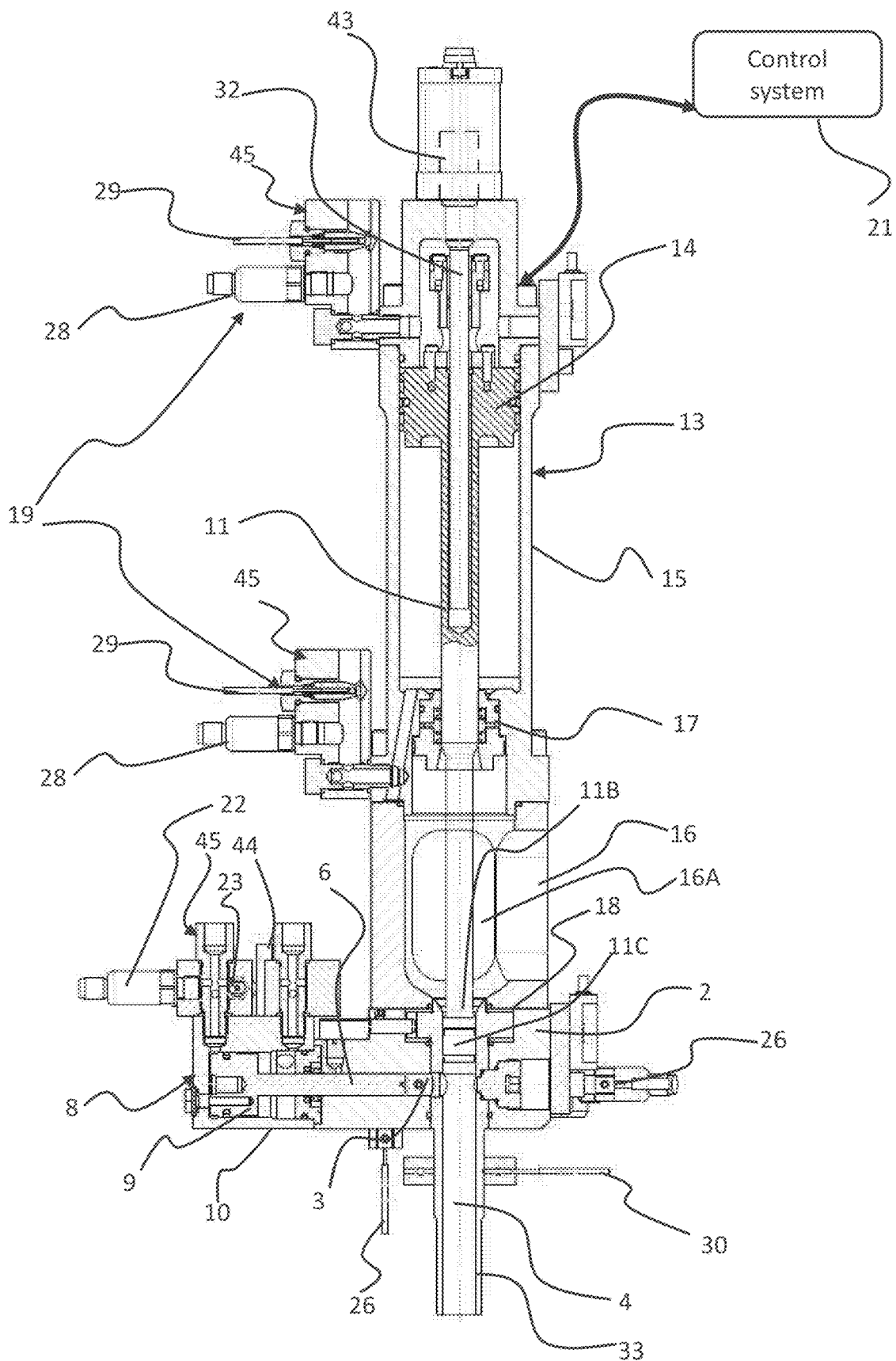
FIG. 3 shows a sectional view of a high-pressure mixing, dosing and recirculation head with an L configuration according to the present invention.

In FIG. 3 it is further visible how in the present embodiment the supply duct 4 is represented by a sleeve 33 that is structurally independent and inserted in a suitable seat 18 of the head body 2.

Figure 7A:
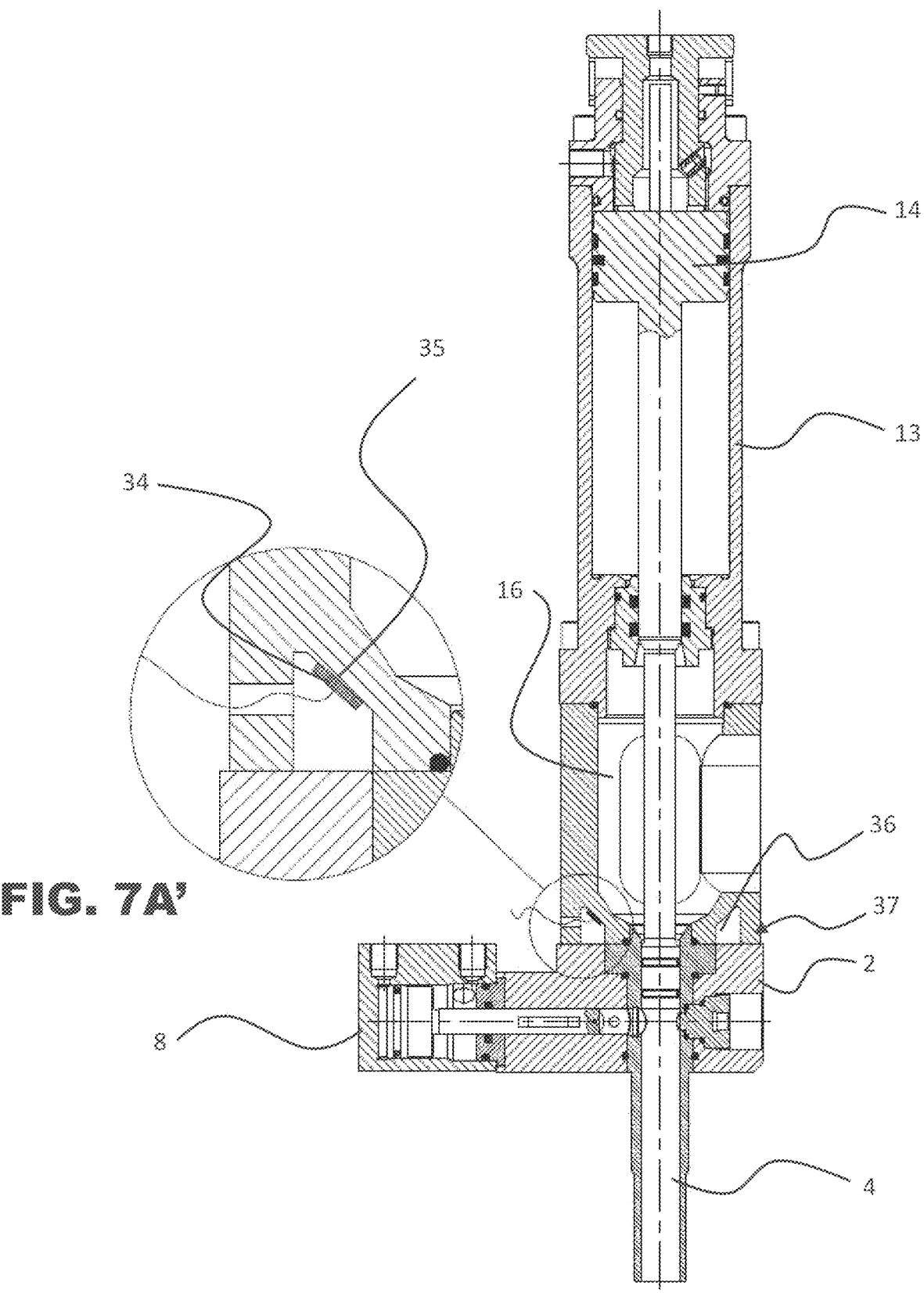
FIG. 7A, 7B, 7C, 7D and the enlargements 7A', 7B', 7C', 7D' show exemplifying configurations of the high-pressure mixing, dosing and recirculation L-head of FIG. 3.
Figure 7B:
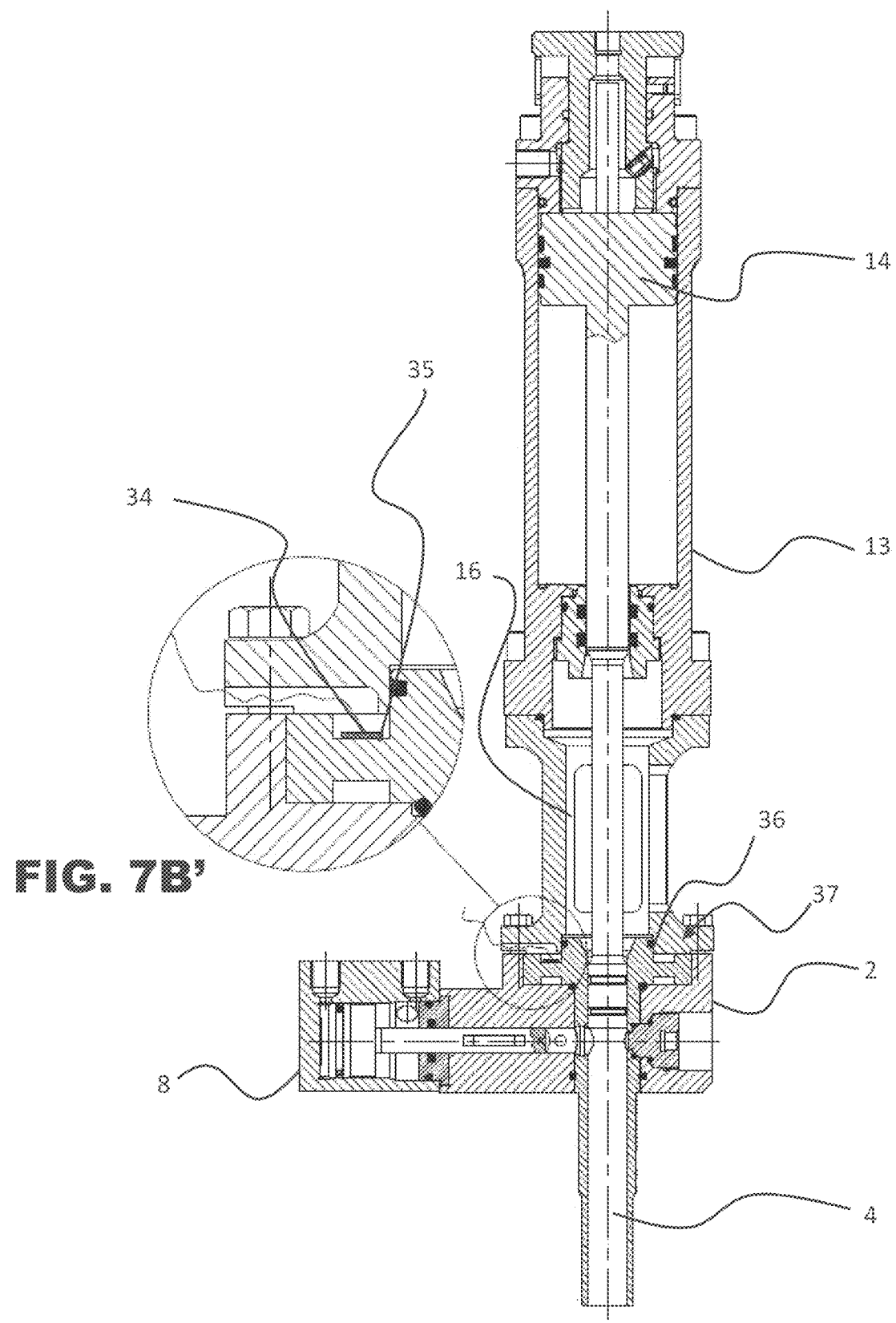
Figure 7C:
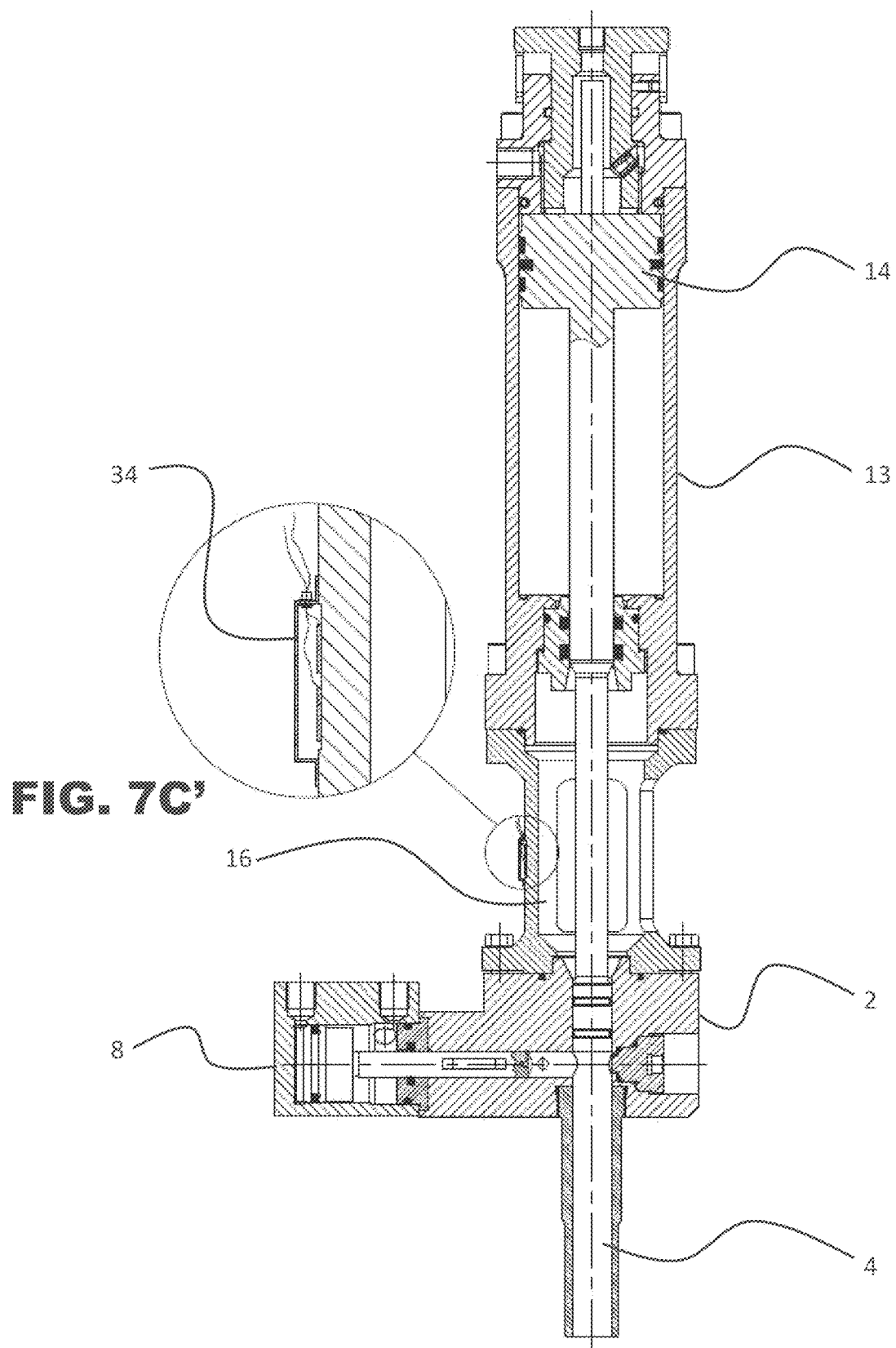

Nothing forbids, for the purpose of the present invention, the adoption of a supply duct integrally formed with the whole head body 2 or applied with a threading or with blocking screws to the lower part of the head body, i.e. in the outlet direction of the reacting resins, as visible in FIG. 7C.

In FIG. 3 to FIG. 10 a plurality of sensors and transducers is visible, which are hereinafter globally indicated as sensors and transducers 19 that are adapted to detect specific physical quantities during the operation of the high-pressure mixing, dosing and recirculation head 1, 1', and to convert the measured physical quantity into an electric signal. The electric signal sent to the plurality of sensors and transducers 19 is sent to a storing and control system 21, that is adapted to store, associate over time and identify, based on said electrical signals, the operational status of the mixing head 1, 1'. Operational status means the set of data characteristic of the operation of the high-pressure mixing and recirculation head 1, 1'.

Significant physical quantities are detected and stored in digital form at the inlets and outlets of the control hydraulic fluid of the mixing valve 6.

In fact, it is useful and often necessary to detect temperature and pressure of liquid reactive components and service fluids. In particular, the control fluid of the mixing valve 6 and of the self-cleaning stem 11 is monitored, at the inlet of the various utilities, and still more particularly at the inlet or outlet of the hydraulic control devices of the mixing valve 6 and of the self-cleaning stem 11 and at the introduction of reactive liquids into the head body 2 and at the outlet from the recirculation slots.

The temperature of the inletting reactive liquids is a parameter useful to control the reaction process, whereas through their pressure it is possible to determine the efficiency of the mixing process.

The difference in temperature between inlet of the liquids and outlet through the recirculation slots further allows to determine the energy introduced during the transformation between pressure and kinetic energy.

Furthermore, the pressure at the outlet allows to determine the pressure drops along the recirculation pipes and the extent of the pressure drop at the opening of the mixing valve.

For the hydraulic control liquid, the temperature at the two ends of the stroke of the self-cleaning stem 11 allows to monitor the progressive energy transfer to the liquid and thus to detect any abnormal operating condition.

Specifically, pressure transducers are adopted, also acting as control pressure switches 22 for detecting the inlet and/or outlet pressure to the cylinder chambers which, given the propagation speed of the pressure itself in the fluid, corresponds to that of the control cylinders chambers of the mixing valve; resistance thermometers or control thermocouples 23 for detecting the temperature of the control fluid of the mixing valve. Flow transducers (not shown) may also be adopted to detect the inlet and/or outlet flow rate from the mixing valve command.

Physical quantities at each injector 5 are further detected and measured, in particular quantities relating to each reactive resin introduced through these injectors 5.

Also in this case, pressure transducers are used, also acting as pressure switches 25 for the detection and measurement of the pressure of each reactive resin both when the mixing valve 6 is in the open position, and therefore each reactive resin flows inside the mixing chamber 3, and when the mixing valve 6 is in the closed position, and therefore each reactive resin flows along the recirculation path defined by the recirculation slots, and during the transients in which the valve is moved in opening or closing, phases during which each injector is temporarily blinded by the passage of the cylindrical front without slots in the valve. Temperature sensors such as detection and measurement thermocouples or thermo-resistances 26 are also adopted for the detection and control of the flow temperature of each reactive resin both when the mixing valve 6 is in the open position and when it is in the closed position.

The temperature at the input of the reactive resins is very relevant, since, when the mixing, dosing and recirculation head is fixed to the mold, the molds are usually heated to temperatures in the order of 50° C., since this temperature favours the chemical reaction rapidity between the resins. As a result, the head body, in contact with the mold, reaches analogous temperatures. Conversely, the maintenance temperature of each resin is generally in the order of 20° C. and this difference in temperature may lead to deformations of the structure and of the head components in the inlet and recirculation areas of the reactive resins, which are potentially harmful given the low dimensional tolerances which must be adopted for an optimal operation. As a result, the knowledge of the temperatures involved through the sensors and the temperature probes allows, through the control electronic system, to monitor any thermal stress conditions to be reduced with suitable actions on the cycles and recommendations for better head insulation.

Flow rate transducers (not shown) are also used for the detection and control of the flow rate of each reactive resin exiting from the injector 5 and introduced either into the mixing chamber 6 or along the recirculation path.

Furthermore, significant physical quantities of the hydraulic fluid are detected at the inlet and/or outlet from the control cylinder 15 of the scraping portion 11C of the self-cleaning stem 11. Pressure transducers, also acting as control pressure switches 28, to detect pressures of the inlet and/or outlet hydraulic fluid and of the chambers of the self-cleaning control cylinder, temperature sensors, housed in suitable probes, such as detection and measurement thermocouples or thermo-resistances 29 for detecting the temperature of said hydraulic fluid, flow rate transducers (not shown) for detecting the inlet and/or outlet hydraulic fluid flow rate for controlling the self-cleaning stem, are used.

In the exemplifying and non-limiting embodiments the selected pressure transducers detect the instantaneous pressure of the fluid through a fitting mounted on the inlet and/or outlet ducts and send the value to the sampling and storing system associated with the control system 21, through an analogue electric signal or through a digital signal with sampling times that may vary from 1 sec up to 0.1 milliseconds.

Preferably, the plurality of pressure and temperature transducers 19 is grouped in specific assemblies so as to detect the quantities needed to control afferent and efferent fluids, in inlet and direct outlet, from the mixing head at the above significant detection positions. These specific assemblies are preferably inserted into suitable support structures 45, also called "detection blocks", as visible in FIG. 3A, 3B, 3C, 3D, and in the respective sections of FIG. 3A', 3B', 3C', 3D'.

The support structures 45, preferably metallic, are preferably fixed by means of a hollow bolt 46, inside which the liquid flows. This solution allows to reduce the overall dimensions and to orient the inlets by rotating the support structure 45 about the hollow bolt 46 before tightening it.

The support structure 45 has an inlet and outlet hole 47, for the delivery and return, respectively, which is preferably but not necessarily threaded, and an outlet and inlet hole 48, for the delivery and return from and towards the mixing head 1, respectively, which is equipped with a seat for a seal gasket.

A sensor hole 49 is preferably in communication along said holes 47 and 48, preferably at the latter. Within said sensor hole 49 a pressure transducer of the plurality of sensors and transducers 19 is installed. In FIGS. 3A and 3A' a configuration of the support structure 45 with lateral arrangement of the sensors and transducers 19 is represented, whereas in FIGS. 3B and 3B' a configuration of the support structure 45 with axial arrangement of the sensors and transducers 19 is represented.

Still preferably, a probe 23 comprising a thermo-resistance or a control thermocouple is introduced into said holes 47 and 48, preferably at the delivery or return hole 47.

Figure 3C:
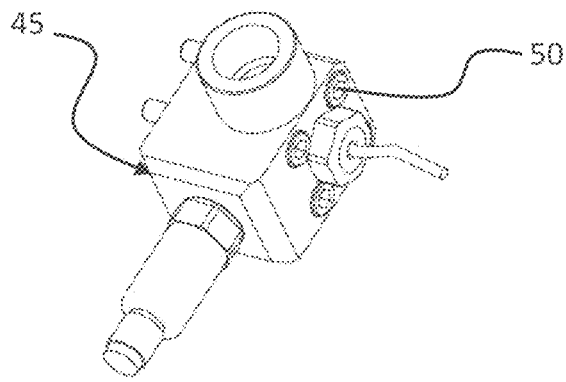
Figure 3C:
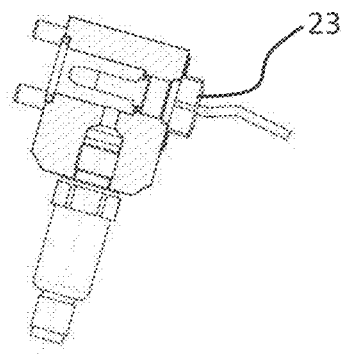

Nothing prevents from alternately adopting different fixing screws 50, as shown in FIGS. 3C and 3C', or different fixing solutions, which are not limiting of the scope defined be the enclosed claims.

Figure 3D:
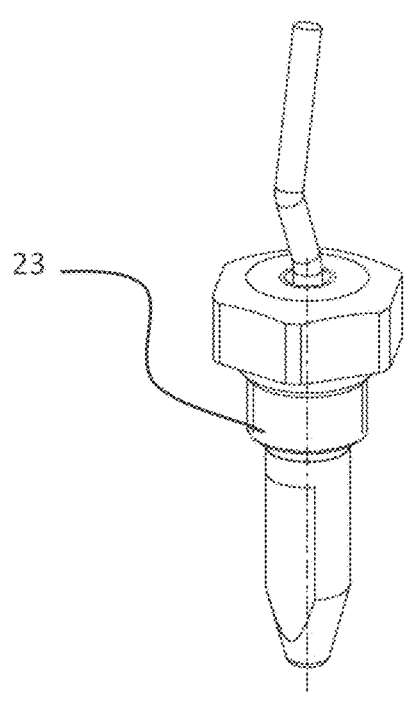
Figure 3D:
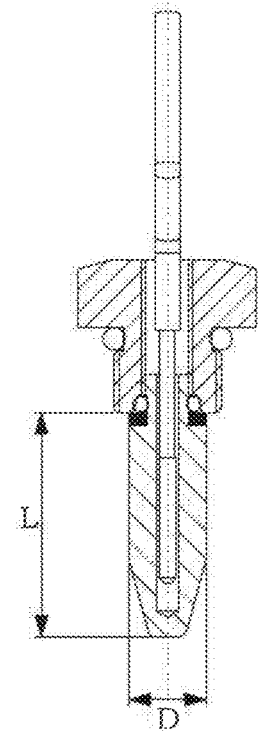

The temperature probe, in a preferred embodiment represented in FIGS. 3D and 3D', is made of a hollow ogive that is very small and with reduced thickness and enough to withstand the pressure which it is subjected to.

The ogive is totally immersed in the fluid vein from which the temperature to be detected is transmitted, whereas it has a limited heat exchange with the support structure or block 45.

In a particular embodiment, the thickness of the ogive is calculated so as to support a pressure of at least 300 bar and based on the metal used, for example aluminum or steel or titanium alloys.

In said embodiment the ratio between dimension of the length immersed in the fluid vein L with respect to the thickness D is greater than 2, preferably equal to 4.

The ogive é preferably shaped with two plane portions and with a stop annular shoulder for tightening. Below said shoulder it is possible to insert a ring of polymeric or ceramic insulating material to improve insulation from the support structure 45.

The hollow bolt 46 allows a screwing from the outside within the inlet hole 47 in the fluid vein. The connection cable of the thermo-resistance or control thermocouple 23 may be included in a fairlead to protect the thermo-resistance or control thermocouple 23 from the external environment while it is not in direct contact with the liquid.

The sensors inserted in the probes are connected to a device for feeding, amplifying and conditioning the signal that sends the value thereof as an analogue or digital electric signal to the sampling and storage system associated with the control system 21.

Preferably, the described flow rate transducers are of the volumetric or mass type. The volumetric flow rate transducers sample the frequency of on/off signals generated by the passage of teeth, corners or notches or steps of the element whose volume is crossed by the fluid while the mass transducers detect variations in resonance frequencies linked to the Coriolis effect and at the proper frequency of vibrating ducts through which the fluid passes. Both may generate series of on/off signals or direct measurements of the instantaneous flow rate which they directly send to the sampling system of the command and control apparatus 21.

Figure 5:
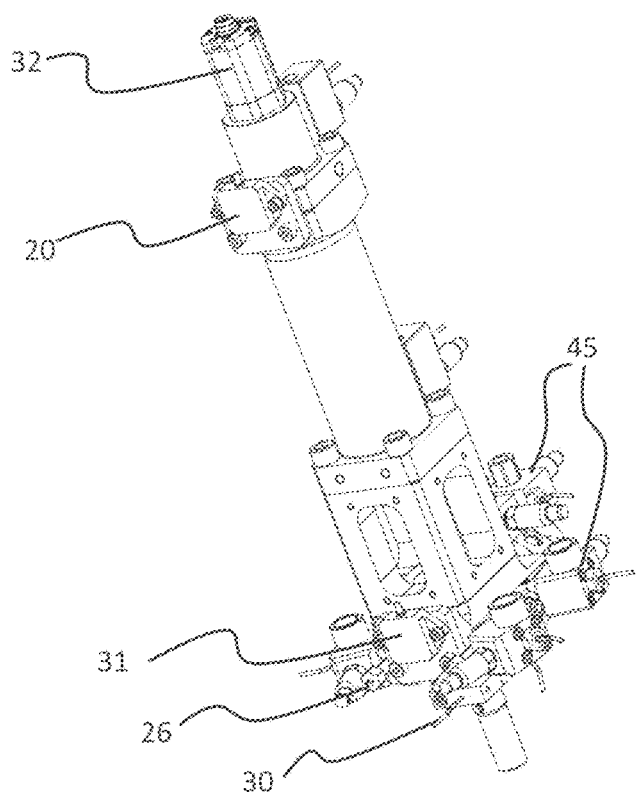
FIG. 5 shows an axonometric view of the high-pressure mixing, dosing and recirculation L-head of FIG. 3.
Figure 6:
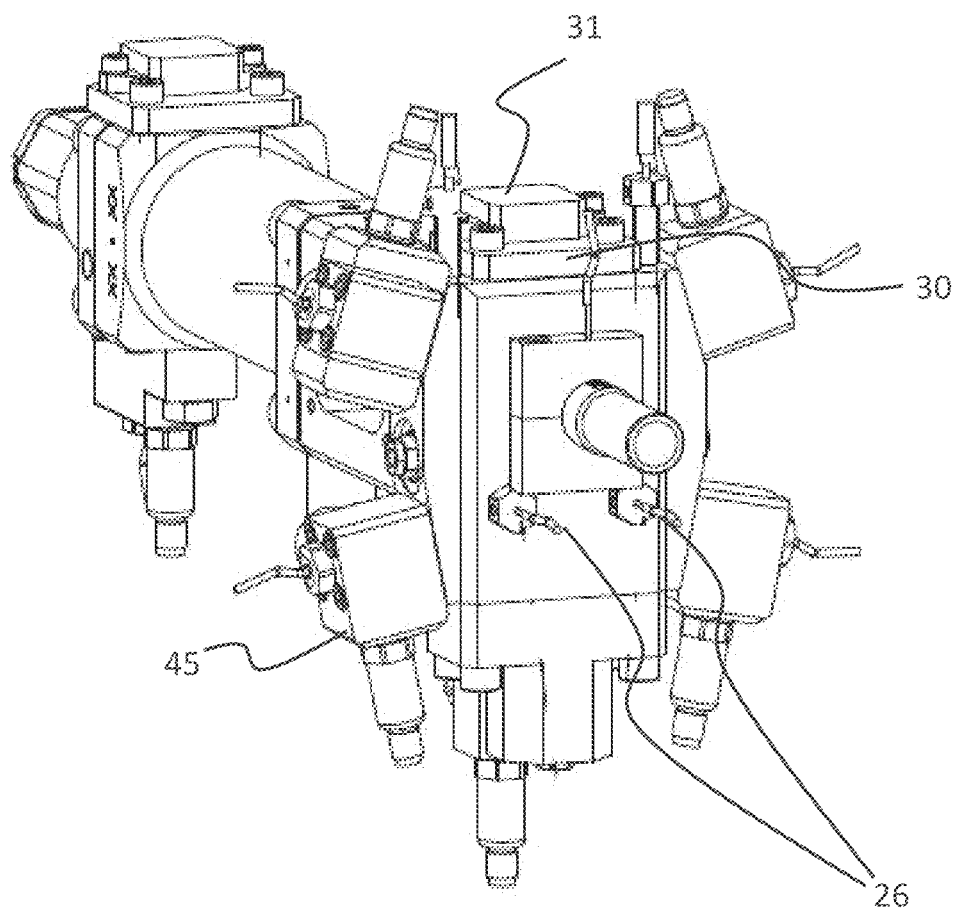
FIG. 6 shows another axonometric view of the mixing and dosing L-head of FIG. 3.

In FIG. 5 two accelerometers are further visible, an accelerometer 20 placed at the control cylinder 15 of the control stem 11 of the scraping portion 11C and an accelerometer 31 fixed to the head body 2, to detect the acceleration, i.e. subjected vibrations and pulses of the high-pressure mixing, dosing and recirculation head 1' in three-space directions and preferably in the longitudinal direction of the self-cleaning element 11.

Furthermore, the position and speed of the scraping portion 11B of the self-cleaning stem 11 must be detected and transduced. This detection is carried out using a position linear transducer 32 that also detects the speed thereof by means of the ratio between the increase in the position signal and the time elapsed. This transducer is inserted in the control piston 14 and/or in the self-cleaning stem 11. These transducers may detect a rebound length of sound waves or a change in resistance or detect specific notches on an optical or magnetic scale.

In this embodiment temperature sensors 26, 30 based on resistance thermo-resistances or thermocouples are also provided for the detection and measurement of the temperature at components surfaces of the mixing head that are significant in the global heating status of the high-pressure mixing, dosing and recirculation head 1, 1', i.e. the head body 2, the supply duct 4, the control cylinder 15 of the self-cleaning stem 11.

In the present embodiment, an important detection and transduction is that of specific forces that the self-cleaning stem exchanges with the supply duct of the high-pressure mixing and dosing head during the movement of the self-cleaning element 11. These forces are generally derived from friction stresses, scraping and dragging up to the expulsion of residues or shavings of the reacted resins during the movement of the scraping element along the surface of the self-cleaning ducts, in particular of the supply duct, during the sliding of the dragging portion 11B of the self-cleaning stem 11 and of the scraping portion 11C. In fact, in the ducts wherein the reacting resin flows, a veil of reactive polymers is formed, which is adherent and resistant to dragging and sliding and which may develop resistance forces to dragging of up to 150-200 Newton/mmq. This resistance implies the development of a sliding friction that generates a strong contribution of local heat to the surfaces involved in the self-cleaning function, that is, the expulsion of the resin debris towards the outlet or towards the chamber of the spacer 16 of the self-cleaning duct.

This heat generates a strong local heating which, concurrently with the friction itself, may cause a further increase in the friction itself and damage to the surfaces of the elements themselves that are responsible for sliding, scraping and expelling debris.

The indirect detection of these forces, therefore, is fundamental for monitoring the normal operation of the self-cleaning elements, both for those that also control the start and end phases of the supply and therefore for the accuracy of the supply cycle, and for the elements that expel the reacting resins from the supply duct and remove the residues of accumulated reacted resin, monitoring the state, compared to normal, of the sliding and therefore of the surfaces of these elements on the surfaces on which the polymer has adhered, as well as of a possible accumulation of the reacted polymer in particular positions.

Figure 7D:
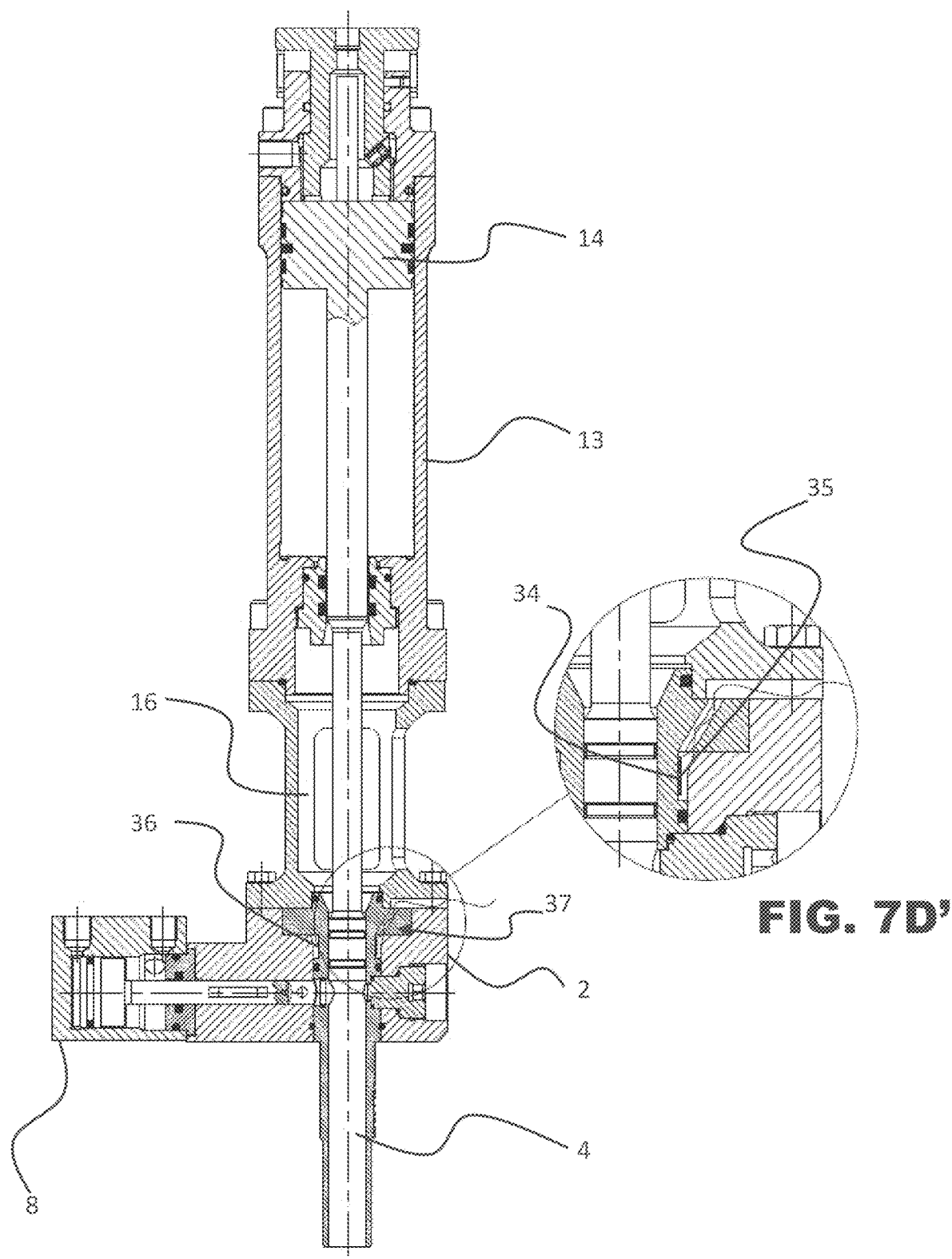

This detection, as visible in FIG. 7A, 7B, 7D is made effective and possible by the configuration of the supply duct made as a single piece in the shape of a sleeve 33 and by the corresponding coupling of the same with the spacer 16 which blocks the flange or upper extension of said supply duct against the head body and transfers the forces generated by the sliding of the self-cleaning stem 11 to the hydraulically controlled cylinder as a reaction to the action of the same.

The detection of the stress status change is carried out at significant positions of the stress state transmitted to the supply duct surface by the sliding of the scraping section of the self-cleaning stem 11C and by the accumulation of reacted resin along the dragging section 11B of the self-cleaning stem, i.e. between the supply duct 4, the head body 2 and the lower surface of the spacer 16, by means of strain gauges, or extensimetric resistances, 34 or by means of load cell. In particular, the force transmitted by the supply duct 4 towards the command 15 of the self-cleaning element is detected by means of the deformation of a surface 35 that is specifically suitable to a most significant local deformation as a function of the stress status acting on the flange or radial extension 37 of the diameter of the sleeve 33 forming the supply duct 4, as provided for in particular in FIG. 7A, 7B, 7D, extension that allows the blocking thereof between the upper part of the head body and the spacer. This most significant local deformation is detected by strain gauges 34 applied on a reduced circumferential section 36 of said flange or extension 37. In the illustrative embodiments shown in FIG. 7A to 7D the reduced circumferential section is either obtained circumferentially inside the fixing flange 37 of the sleeve 33 forming the supply duct 4 or it is represented by a specific collar with reduced section below the flange or extension of the sleeve 33 forming the supply duct 4, or still it is obtained on the base of the spacer 16.

These strain gauges 34 suitably glued on the surface of the reduced section 36 and bridge-connected as Wheatstone bridge to compensate for the thermal deformations directly detect the deformation and therefore the stress that is transmitted by the scraping section 11C and by the reacted resin accumulated on the dragging section of the self-cleaning stem 11B to the supply duct 4 during the alternate sliding.

In an alternative embodiment the detection of the variation in the stress status generated by the sliding forces of the scraping section of the self-cleaning stem 11 and transmitted to the supply duct is carried out as shown in FIGS. 7A and 7C, directly on surfaces provided in the structure of the spacer 16.

The supply duct, in this case, may be as a single piece or formed in part by the sleeve 33 and in part by the head body which it is fixed to at the bottom, or it may be a part integral with the head body which directly transmits the scraping and self-cleaning forces to the lower surface of the spacer 16. In particular, as shown in FIG. 7A, a surface is provided which is specifically suitable to locally deform more significantly connected to the rest of the spacer 16 through a ring section of reduced thickness and therefore better sensitive to the deformations deriving from the variation in the stress status deriving from the scraping forces transmitted by the flange or peripheral extension of the sleeve 33 to the annular portion of the spacer 16 that blocks said flange or annular extension of the sleeve 33 against its own seat obtained in the upper part of the head body.

On the surface of the reduced section strain gauges 34 are glued, which are suitably bridge-connected as a Wheatstone bridge to compensate for the thermal deformations and which directly detect the deformation and therefore the stress that is transmitted to the scraping section of the self-cleaning stem 11C and by the reacted resin accumulated on the dragging section 11B to the supply duct 4 during the alternate sliding.

The arrangements of the sensitive surfaces and of the strain gauges allow to keep physically separated, by means of suitable seals, the surfaces which they are applied to, from what accumulates or is introduced as a lubricant into the chamber spacer 16A and therefore to protect them from the contamination of any lubricating liquid and the resin shavings transported by the movement of the scraping part of the self-cleaning stem. The outlet and protection of the connection wires to the strain gauges are also facilitated.

A further alternative embodiment is shown in FIG. 7C. For this case it is possible to create, along the structures that longitudinally extend the spacer 16 towards the control hydraulic section of the self-cleaning stem, reduced sections on which to apply strain gauges 34 on prepared portions of the external surfaces of the structure. In particular strain gauges 34 are glued on the prepared surfaces, said strain gauges 34 being suitably connected as a Wheatstone bridge to compensate for the thermal deformations and they directly detect the deformation and therefore the stress that is transmitted by the scraping section of the self-cleaning stem 11B to the supply duct and thus to the spacer 16 that acts as mechanical interconnection element between the head body on which the scraping force is released and the control section on which the reaction forces which actuate the self-cleaning stem during its own alternate movement are released.

Figure 8:
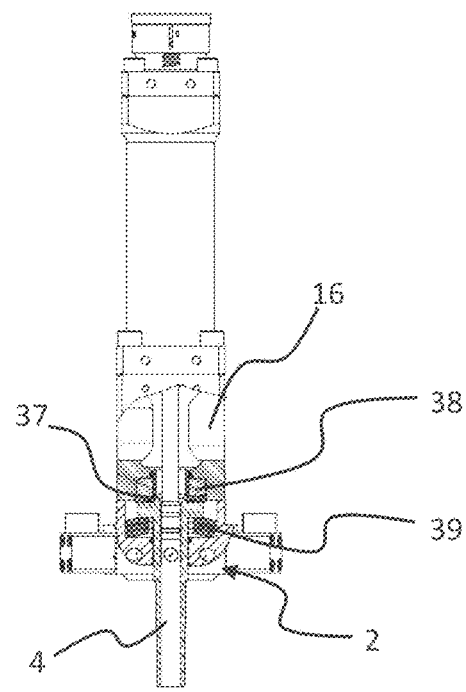
FIG. 8 shows a sectional view of a specific configuration of the high-pressure mixing, dosing and recirculation L-head of FIG. 3.

In an alternative embodiment, as visible in FIG. 8 it is possible to position an annular-shaped load cell 38 placed between the ring extension 37, the head body 2 and the spacer 16, which is pushed against the fixing flange 37 by means of a preloaded elastic ring or preloaded springs 39, which react or rest against the head body 2 and push said ring extension in a preloaded manner, against the abutment plane on the seat obtained in the lower part of the spacer 16. In an alternative configuration the elastic ring or the preloaded springs 39 push onto the ring extension 37 and react, with suitable preload, on the lower plane of the spacer 16, whereas the load cell 38 is placed between the lower surface of the flange 37 and the head body 2.

Both configurations allow to directly detect the load variation transmitted by the supply duct 4 bushing during the scraping movement of the scraping portion 11C and by the reacted resin accumulated on the dragging section 11B of the self-cleaning stem 11.

In other words, both in the embodiment with strain gauges 34 and with the load cell 38 the force transmitted by the sliding of the self-cleaning stem 11 to the surfaces of the supply duct 4 is detected and measured, and it is synchronized with the movement controls of the self-cleaning stem, possibly with the measurement of the differential pressures in the control chambers of the piston head 14 that is rigidly connected with the self-cleaning stem 11 and with the movement, considered both in terms of position and speed, of the piston head 14 itself and consequently of the scraped portion 11C.

Figure 9:
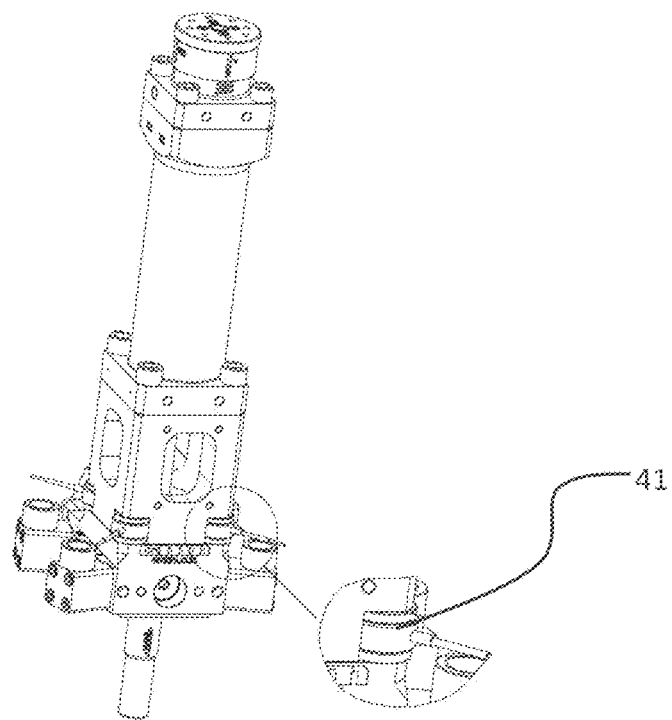
FIG. 9 shows an axonometric view of a specific configuration of the high-pressure mixing, dosing and recirculation L-head of FIG. 3 with a partial enlargement.
Figure 10:
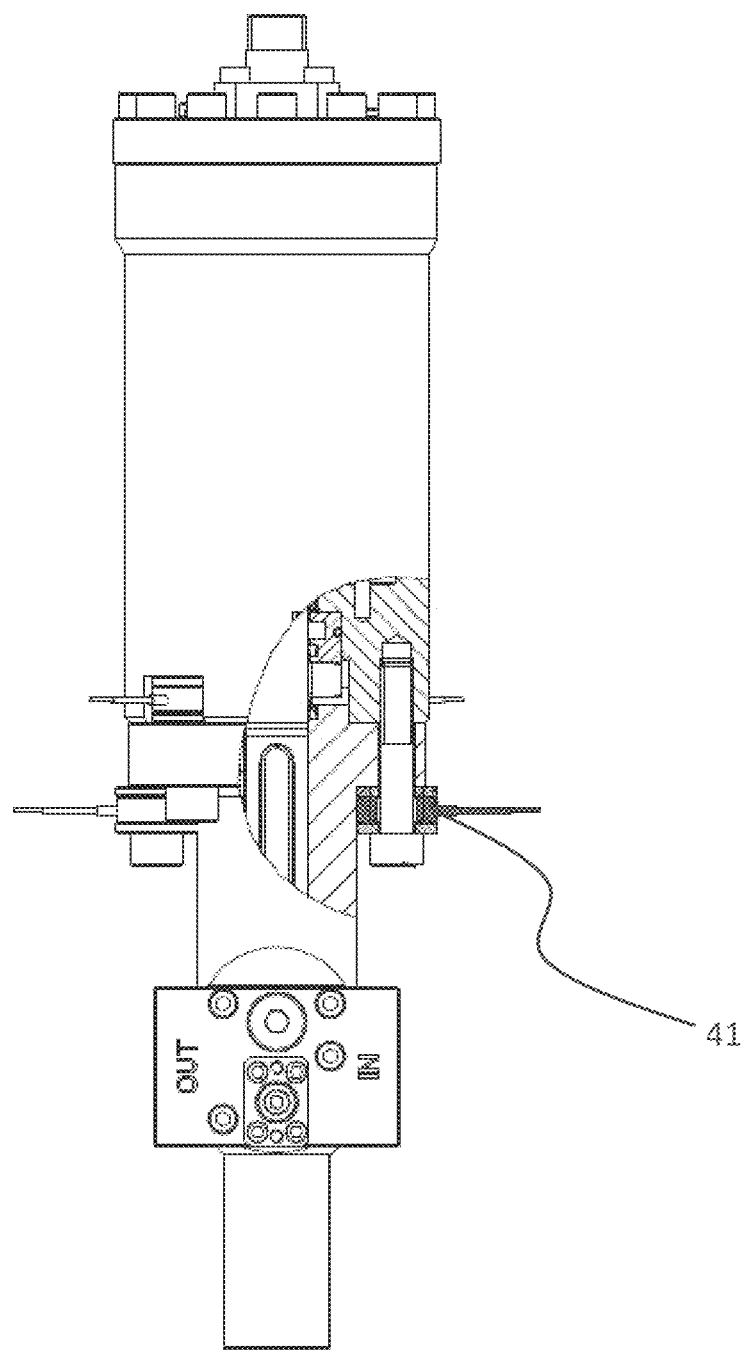
FIG. 10 shows a sectional partial view of the high-pressure mixing, dosing and recirculation straight head of FIG. 1.

In still an alternative embodiment visible in FIGS. 9 and 10, respectively for an "L-head" and in FIG. 10 for a "straight" head, it is possible to position at least one load cell 41 at at least one fixing screw of the control cylinder 15 of the element or self-cleaning stem 11. Said at least one load cell 41 detects the load variation acting on the respective screw to detect the difference in force transmitted by one or more constraint systems of the supply duct 4 to the head 1 or 1' body 2 and therefore to the spacer 16 generated by the force transmitted by the sliding during the scraping movement of the scraping portion 11C and by the reacted resin accumulated on the dragging section 11B of the self-cleaning stem 11.

The sliding force of the self-cleaning stem may also be detected with load cells suitably inserted in the connections between the different elements forming the high-pressure mixing, dosing and recirculation head 1 or 1'.

Furthermore, in the present embodiment the number of round-trip movements of the self-cleaning stem 11 and of the mixing valve detected by the proximity sensors, respectively indicated as 43 and 44 in FIG. 3, respectively located on the cylinder that controls the mixing valve and on the cylinder that controls the self-cleaning stem as shown in FIG. 3, is detected and stored.

The characteristic parameters of the specific head relating to the first installation and subsequent ordinary and extraordinary maintenance interventions are then stored by synchronizing them temporally via a radio frequency identification pad (RFID) (not shown) applied to the mixing and dosing head. The radio frequency identification pad communicates and records the aforementioned start and end parameters of each supply cycle by interfacing via an antenna (not shown) with a transmitter installed in the command and control apparatus of the dosing machine (not shown), which are programmed to write and update the above parameters. These parameters may be the type of head, the stroke of the moving elements, the constraints of the mechanical assembly, the type of injectors used, the number and type of sensors and transducers installed, the typical parameters of the start and end of the supply and recirculation cycle, the type and basic characteristics of the hydraulic oil and chemical components supply, the references to the installer and customer.

It will be apparent to the skilled person that the embodiments described by means of the figures are exemplifying and not limiting. Indeed, nothing prevents the adoption of thermo-resistances in place of thermocouples and vice versa, just as it is possible to select different types of sensors and transducers to detect and transmit the aforementioned significant physical quantities in the significant points described.

The values of the detected physical quantities, suitably sampled and digitalized, in the present embodiment are sent and stored in mass memories (not shown), inside the control system 21 to be further retransmitted in real time to digital processing, conditioning and analysis units (not shown) for the purpose of a subsequent processing. Each value is stored also associated with a signal corresponding to a start instant that may be typical of each supply cycle or multiple for the same supply cycle. The signal is used to synchronize the different and multiple digitalized and stored signals to determine the contemporaneity thereof and to analyze them in a comparative and multiple manner at the same sampling moment.

The data detected by the sensors and transducers are thus sampled, digitalized and stored by the memorization, storage and processing system that synchronize them with the single operation sequences of the head and provide them for the successive processing to diagnose the functionality and any deviations from the correct operation.

The present invention solves the technical problem and achieves several advantages, the first of which is surely given by the fact that the physical quantities detected, suitably stored and processed, allow to analyze the behavior and performances of the high-pressure mixing and recirculation head 1, 1' in order to control and verify the optimal performances.

This also allows to evaluate the occurrence and accentuation of abnormal operations and therefore of possible malfunctions in a preventive manner, safeguarding the integrity of the mixing head.

Advantageously the plurality of sensors and transducers allows to compare the different detected signals by synchronizing them over time starting with the beginning of each process phase of the mixing head, e.g. opening phase, closing phase, recirculation phase, etc.

Furthermore, advantageously the digitalization of the signals is suitable for monitoring the specific performances of the high-pressure mixing, dosing and recirculation head 1 or 1'.

Finally, a further advantage is given by the simple implementation in pre-existing injection or casting reaction molding systems.

It will be apparent to the skilled person that changes and variants may be made to the present invention, all within the scope of the invention defined by the appended claims.

The invention claimed is:

1. High-pressure mixing, dosing and recirculation head for injection or casting reaction molding, comprising:
   a head body,
   a mixing chamber, formed in the head body,
   a supply duct in fluid communication with the mixing chamber,
   a self-cleaning element, comprising a scraping portion structured to slide in said supply duct,
   an apparatus for controlling and commanding the mixing, delivery and recirculation comprising:
   a plurality of sensors and transducers installed on board of said mixing, dosing and recirculation head to detect and transform representative physical quantities of at least one operational status of said high-pressure mixing, dosing and recirculation head high-pressure into electrical signals; and
   an electronic control and storing system adapted to control and synchronously scan said sensors and transducers and to receive and process said electrical signals indicative of said at least one operational status, at the beginning and during the operational phases of said high-pressure mixing, dosing and recirculation head to compare them with each other and with electrical signals representative of a predetermined reference operational status,
   wherein said supply duct is made as a single piece by a sleeve connected to said head body by means of a flange or peripheral portion blocked between said head body and a spacer element.

2. High-pressure mixing, dosing and recirculation head according to claim 1, wherein said plurality of sensors and transducers comprises at least one pressure transducer, also acting as a control pressure switch, for detecting pressures in at least one of the chambers of control cylinders.

3. High-pressure mixing, dosing and recirculation head according to claim 1, wherein said plurality of sensors and transducers comprises at least one pressure transducer, also acting as a control pressure switch, for detecting pressures in at least one inlet and/or outlet of a reactive resins.

4. High-pressure mixing, dosing and recirculation head according to claim 1, wherein said plurality of sensors comprises at least one probe equipped with control thermocouple and/or a thermo-resistance, for detecting temperatures in significant positions of a mixing head.

5. High-pressure mixing, dosing and recirculation head according to claim 4, wherein said at least one probe equipped with control thermocouple and/or thermo-resistance is immersed at a fluid vein of control cylinders.

6. High-pressure mixing, dosing and recirculation head according to claim 4, wherein said at least one probe equipped with control thermocouple and/or thermo-resistance is immersed in a fluid vein at an inlet and/or outlet of reactive resins.

7. High-pressure mixing, dosing and recirculation head according to claim 1, wherein a specific assembly of the plurality of sensors and transducers is inserted in a plurality of support structures.

8. High-pressure mixing, dosing and recirculation head according to claim 7, wherein said specific assembly of the plurality of sensors and transducers connected with said control apparatus comprises at least one pressure transducer inserted in one of said support structures, at control cylinders.

9. High-pressure mixing, dosing and recirculation head according to claim 7, wherein said specific assembly of the plurality of sensors and transducers comprises at least one pressure transducer, inserted in one of said support structures, at an inlet and/or outlet hole of the reactive resins.

10. High-pressure mixing, dosing and recirculation head according to claim 7, wherein said specific assembly of the plurality of sensors and transducers comprises at least one probe equipped with a control thermocouple and/or a thermo-resistance, inserted in said support structures, at a fluid vein passage of an inlet and/or outlet of control fluids or reactive resins, mounted at the control cylinders and in at least one inlet and/or outlet hole of the reactive resins, for detecting the temperatures of said control fluids, of a reactive resins and on said on a mixing head.

11. High-pressure mixing, dosing and recirculation head according to claim 1, wherein said plurality of sensors and transducers comprises at least one flowmeter or transducer, for detecting flow rates at an inlet and outlet of control fluids.

12. High-pressure mixing, dosing and recirculation head according to claim 1, wherein said plurality of sensors and transducers comprises at least one flowmeter or transducer, for detecting flow rates at an inlet and outlet of reactive resins.

13. High-pressure mixing, dosing and recirculation head according to claim 1, wherein said plurality of sensors and transducers comprises at least one accelerometer, for detecting vibrations and pulses on said head.

14. High-pressure mixing, dosing and recirculation head according to claim 1, wherein said head comprises at least one section with significant local deformation, said section being preferably obtained by axial revolution about an axis of said supply duct.

15. High-pressure mixing, dosing and recirculation head according to claim 14, wherein said plurality of sensors and transducers comprises at least one strain gauge, for detecting the differential deformation of characteristic surfaces, differential deformation that is directly connectable to the force transmitted by said scraping portion and by the accumulation of reacted resin along the dragging section of said self-cleaning stem to the supply duct during its own movement.

16. High-pressure mixing, dosing and recirculation head according to claim 14, wherein said surfaces of the section with most significant local deformation are suitable to deform as a function of the stress status acting on a locking peripheral extension of said sleeve, or to deform as a function of the differential stress status transmitted by said locking peripheral extension of said sleeve to an annular portion of a spacer that blocks said self-cleaning element or directly on suitable surfaces along the longitudinal development of said self-cleaning element.

17. High-pressure mixing, dosing and recirculation head according to claim 14, wherein said plurality of sensors and transducers provides at least one further strain gauge connected and supplied for the compensation of a thermal deformation.

18. High-pressure mixing, dosing and recirculation head according to claim 1, wherein said plurality of sensors and transducers comprises at least one load cell, for detecting changes in force on said cell, detecting the deformation directly connectable to the force transmitted by said scraping portion and by the accumulation of reacted resin along the dragging section of said self-cleaning stem to the supply duct during its own movement.

19. High-pressure mixing, dosing and recirculation head according to claim 1, wherein said plurality of sensors and transducers comprises at least one identification and radiofrequency characterization pad.

20. High-pressure mixing, dosing and recirculation head according to claim 1, wherein said plurality of sensors and transducers comprises at least one control thermocouple and/or a thermo-resistance, for detecting the temperature of significant sections of the head body subjected to thermal cycles deriving from the passage of the reactive resins in the supply, exit and recirculation ducts at said head body.

21. High-pressure mixing, dosing and recirculation head according to claim 20, wherein said at least one control thermocouple and/or a control thermo-resistance is inserted in a support structure for detecting the temperature of an outer surface along a lower extension of said supply duct.

22. High-pressure mixing, dosing and recirculation head according to claim 1, wherein said plurality of sensors and transducers comprises at least one linear transducer, for the position and speed measurement of said scraping portion of said self-cleaning element.

23. High-pressure mixing, dosing and recirculation head according to claim 1, wherein said control and command apparatus further comprises devices for sampling and digitizing the signals of the sensors/transducers and a mass memory, adapted to store values of said physical quantities in different operational states sampled over time, also comprising a start time of each measurement determining a contemporaneity synchronization with a start of a sequence of said head.

24. High-pressure mixing, dosing and recirculation head according to claim 1, wherein said control system of said control apparatus is a programmable and numerical control logic machine.

25. High-pressure mixing, dosing and recirculation head according to claim 1, wherein said mixing chamber has a longitudinal axis that is transverse to a longitudinal axis of said supply duct.

26. High-pressure mixing, dosing and recirculation head according to claim 1, wherein said mixing chamber also forms said supply duct.

27. High-pressure mixing, dosing and recirculation head according to claim 1, further comprising injectors, adapted to pressure delivery of the supply circuit and for speed conversion of resin jets into said mixing chamber.

28. High-pressure mixing, dosing and recirculation head according to claim 27, wherein said mixing chamber comprises a mixing valve for the sequential opening and closure of a fluid path between said injectors and said mixing chamber.

29. High-pressure mixing, dosing and recirculation head according to claim 28, wherein said mixing valve comprises recirculation openings, adapted to the complete recirculation of the fluids in the closure and interruption phase of said fluid path.

30. High-pressure mixing, dosing and recirculation head according to claim 1, wherein the whole extension of the supply duct is constituted by an independent sleeve inserted in said mixing and dosing head.

31. High-pressure mixing, dosing and recirculation head according to claim 1, wherein said self-cleaning stem is activated by a control device.

32. High-pressure mixing, dosing and recirculation head according to claim 28, wherein said mixing valve is activated by a control device.

33. High-pressure mixing, dosing and recirculation head according to claim 31, wherein a spacer is interposed between said supply duct and said control device of said self-cleaning element.

34. High-pressure mixing, dosing and recirculation head according to claim 10, wherein said probe with control thermocouple and/or thermo-resistance comprises a hollow ogive with a longitudinal dimension L that is greater than a transverse dimension D, totally immersed in the fluid vein from which the temperature to be detected with limited heat exchange is transmitted towards said support structure.

35. High-pressure mixing, dosing and recirculation head for injection or casting reaction molding, comprising:
a head body,
a mixing chamber in the head body and with a supply duct,
a self-cleaning element including a scraping portion sliding in said supply duct,
an electronic control system for controlling and commanding the mixing, delivery and recirculation of said head,
a plurality of sensors and transducers installed on board of said mixing, dosing and recirculation head to detect and transform at least one operational status of said high-pressure mixing, dosing and recirculation head high-pressure into corresponding electrical signals.

36. The High-pressure mixing, dosing and recirculation head of claim 35 wherein said electronic control system is configured to control and synchronously scan said sensors and transducers and to receive and process said electrical signals indicative of said at least one operational status at the beginning and during the operational phases of said high-pressure mixing, dosing and recirculation head.

37. The High-pressure mixing, dosing and recirculation head of claim 35 wherein said electronic control system is configured to compare said electrical signals indicative of said at least one operational status of the head with electrical signals representative of a predetermined reference operational status thus coordinating in a direct or indirect manner the operational status of the high-pressure mixing, dosing and recirculation head.

\* \* \* \* \*